United States Patent
Yi et al.

(10) Patent No.: US 12,231,365 B2
(45) Date of Patent: Feb. 18, 2025

(54) METHOD AND APPARATUS FOR TRANSMITTING UPLINK CHANNEL IN WIRELESS COMMUNICATION SYSTEM

(71) Applicant: Samsung Electronics Co., Ltd., Suwon-si (KR)

(72) Inventors: Junyung Yi, Suwon-si (KR); Youngbum Kim, Suwon-si (KR); Sungjin Park, Suwon-si (KR); Heedon Gha, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 17/576,335

(22) Filed: Jan. 14, 2022

(65) Prior Publication Data
US 2022/0224484 A1    Jul. 14, 2022

(30) Foreign Application Priority Data

Jan. 14, 2021  (KR) .................. 10-2021-0005324
Jan. 18, 2021  (KR) .................. 10-2021-0007060
Nov. 23, 2021  (KR) .................. 10-2021-0162674

(51) Int. Cl.
*H04L 5/00*    (2006.01)

(52) U.S. Cl.
CPC .......... *H04L 5/0051* (2013.01); *H04L 5/0053* (2013.01)

(58) Field of Classification Search
CPC .......................... H04L 5/0051; H04L 5/0053
See application file for complete search history.

(56) References Cited

U.S. PATENT DOCUMENTS

| | | | |
|---|---|---|---|
| 2016/0278048 A1* | 9/2016 | Nory .................. | H04W 72/23 |
| 2017/0367046 A1* | 12/2017 | Papasakellariou .... | H04L 5/0053 |
| 2018/0270880 A1* | 9/2018 | Hosseini .............. | H04L 1/0009 |
| 2018/0279327 A1* | 9/2018 | Ying ................. | H04W 72/0446 |

(Continued)

FOREIGN PATENT DOCUMENTS

| | | | | |
|---|---|---|---|---|
| KR | 10-2021-0095430 A | 8/2021 | | |
| WO | WO-2020226391 A1 * | 11/2020 | .......... | H04L 5/0051 |
| WO | WO-2020232145 A1 * | 11/2020 | .............. | H04L 1/08 |

OTHER PUBLICATIONS

Moderator (Apple Inc.), 'Feature lead summary #2 on PUSCH enhancements for NR eURLLC (AI 7.2.5.3)', R1-2006992, 3GPP TSG-RAN WG1 Meeting #102-e, Aug. 17-28, 2020.

(Continued)

*Primary Examiner* — Jael M Ulysse
(74) *Attorney, Agent, or Firm* — Jefferson IP Law, LLP

(57) ABSTRACT

The disclosure relates to a communication scheme and system for combining an Internet of things (IoT) technology with a fifth generation (5G) communication system for supporting a higher data transfer rate than a fourth generation (4G) system. The disclosure may be applied to intelligent services (e.g., smart homes, smart buildings, smart cities, smart cars or connected cars, health care, digital education, retail business, and security- and safety-related services), based on a 5G communication technology and an IoT-related technology. A method by which the performance of joint channel estimation for multi-uplink repetitive transmission can be enhanced, and the coverage of an uplink channel can be improved is provided.

15 Claims, 24 Drawing Sheets

(56) References Cited

U.S. PATENT DOCUMENTS

| | | | |
|---|---|---|---|
| 2019/0044679 A1* | 2/2019 | Manolakos | H04L 5/0051 |
| 2020/0052827 A1* | 2/2020 | Vilaipornsawai | H04W 72/23 |
| 2020/0052835 A1* | 2/2020 | Xiong | H04L 1/1819 |
| 2020/0367208 A1* | 11/2020 | Khoshnevisan | H04W 72/23 |
| 2021/0360616 A1* | 11/2021 | Yi | H04L 5/0012 |
| 2022/0150928 A1* | 5/2022 | Choi | H04L 5/0044 |
| 2023/0049937 A1* | 2/2023 | Takahashi | H04L 1/1864 |
| 2023/0053388 A1* | 2/2023 | Yamamoto | H04L 27/26 |
| 2023/0208593 A1* | 6/2023 | Ren | H04L 5/0051 370/329 |

OTHER PUBLICATIONS

Huawei et al., 'Potential solutions for PUSCH coverage enhancement', R1-2007583, 3GPP TSG RAN WG1 Meeting #103-e, Oct. 26-Nov. 13, 2020.

International Search Report dated Mar. 29, 2022, issued in International Application No. PCT/KR2022/000713.

\* cited by examiner

FIG. 3

One symbol pattern

301:
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |
| 2/3 | CDM group1 |
| 0/1 | CDM group0 |

Two symbol pattern

302:
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |
| 2/3/6/7 | CDM group1 |
| 0/1/4/5 | CDM group0 |

One symbol pattern

303:
| 4/5 | CDM group2 |
| 4/5 | |
| 2/3 | CDM group1 |
| 2/3 | |
| 0/1 | CDM group0 |
| 0/1 | |
| 4/5 | CDM group2 |
| 4/5 | |
| 2/3 | CDM group1 |
| 2/3 | |
| 0/1 | CDM group0 |
| 0/1 | |

Two symbol pattern

304:
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |
| 4/5/10/11 | CDM group2 |
| 4/5/10/11 | |
| 2/3/8/9 | CDM group1 |
| 2/3/8/9 | |
| 0/1/6/7 | CDM group0 |
| 0/1/6/7 | |

FIG. 16
Consecutive actual repetition (1601):
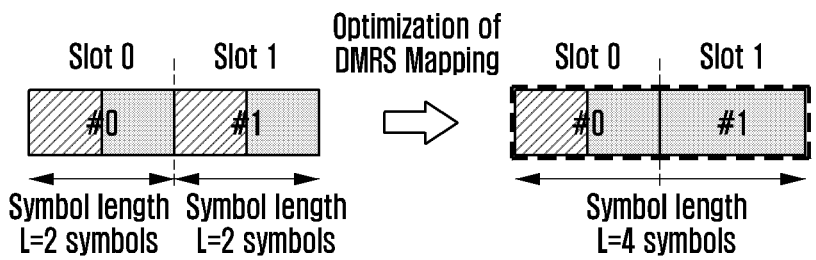
Non-consecutive actual repetition (1602):
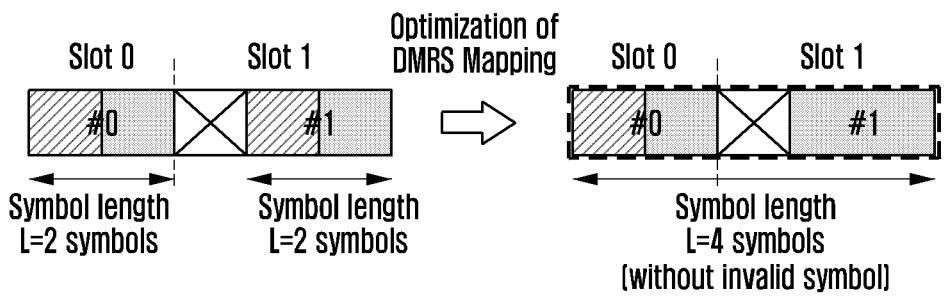
Non-consecutive actual repetition (1603):
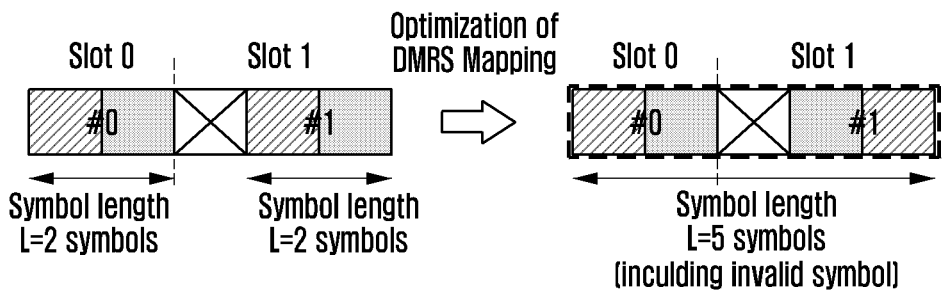

FIG. 21
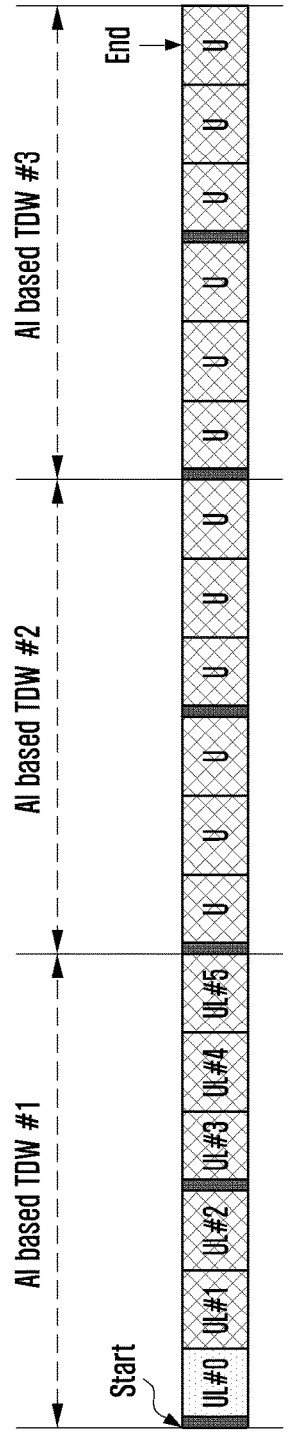
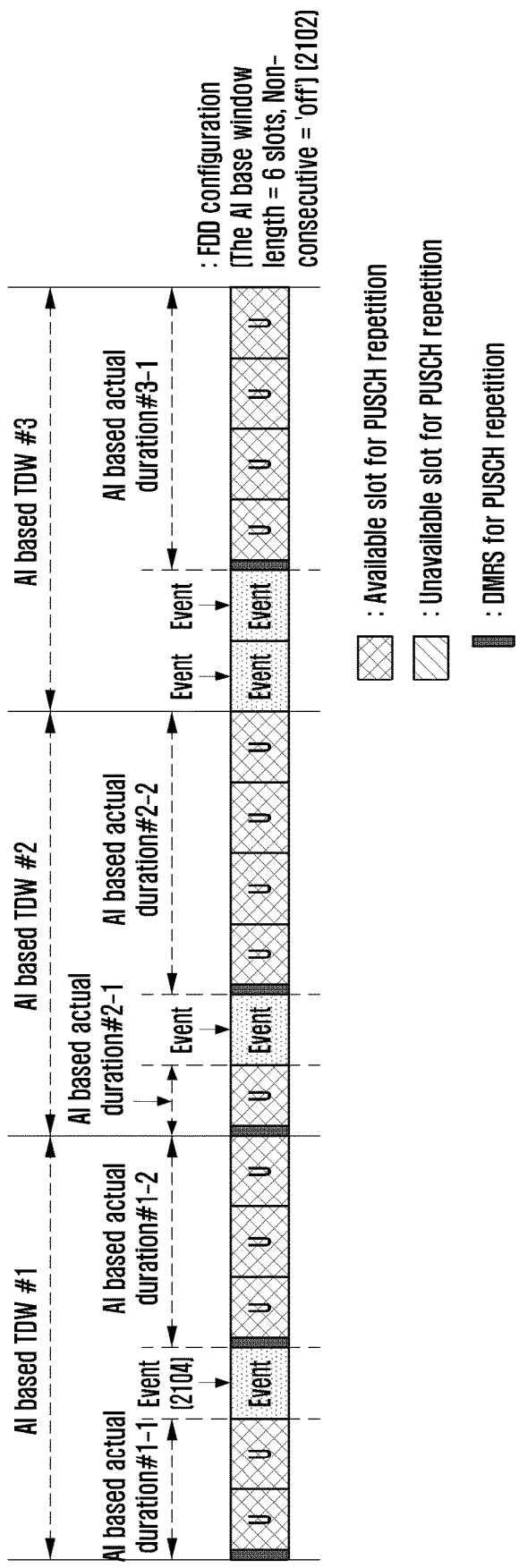

FIG. 22
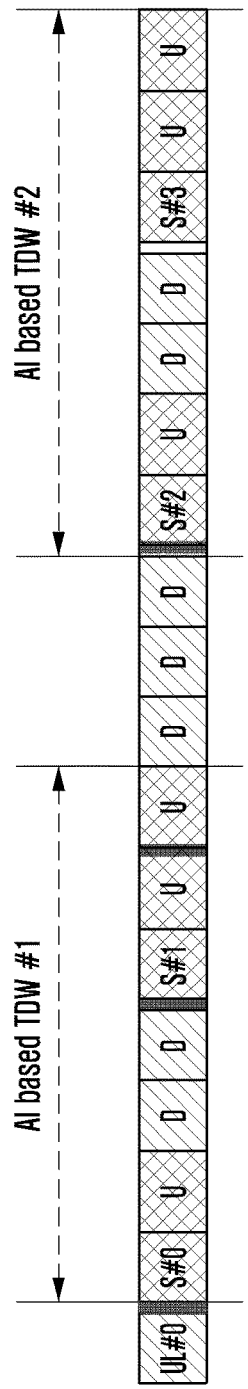
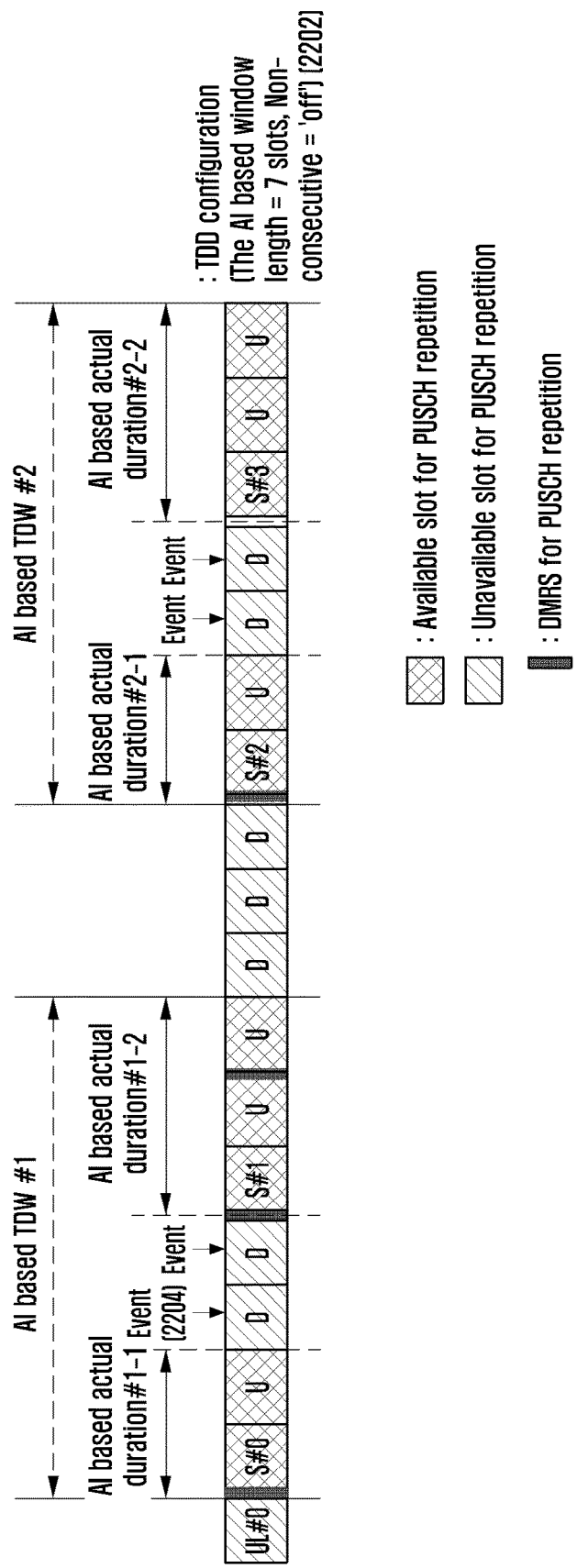

METHOD AND APPARATUS FOR TRANSMITTING UPLINK CHANNEL IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0005324, filed on Jan. 14, 2021, in the Korean Intellectual Property Office, and of a Korean patent application number 10-2021-0007060, filed on Jan. 18, 2021, in the Korean Intellectual Property Office, and of a Korean patent application number 10-2021-0162674, filed on Nov. 23, 2021, in the Korean Intellectual Property Office, the disclosure of each of which is incorporated by reference herein in its entirety.

BACKGROUND

1. Field

The disclosure relates to a method for transmitting or receiving an uplink channel by a base station or a terminal in a wireless communication system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a "Beyond 4G Network" communication system or a "Post long term evolution (LTE)" system. The 5G communication system is considered to be implemented in ultra-higher frequency (mmWave) bands (e.g., 60 GHz bands) so as to accomplish higher data rates. To decrease propagation loss of the radio waves and increase the transmission distance in the ultra-higher frequency bands, beamforming, massive multiple-input multiple-output (MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

According to the recent development of 5G communication systems, the need for a method for repeatedly transmitting an uplink in order to enlarge a cell coverage in an ultra-high frequency (mmWave) band has come to the fore.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus by which the performance of joint channel estimation for repeated uplink transmission in a wireless communication system can be enhanced, and the coverage of an uplink channel can be improved.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, configuration information on a repetition transmission of a physical uplink shared channel (PUSCH), receiving, from the base station, information for determining an invalid symbol, identifying at least one actual repetition including one symbol based on the configuration information on the repetition transmission of the PUSCH and the information for determining the invalid symbol, mapping at least one of a PUSCH or demodulation reference signal (DMRS) to the at least one actual repetition including one symbol, and transmitting, to the base station, the at least one of the PUSCH or the DMRS mapped to the at least one actual repetition including one symbol, and at least one PUSCH mapped to at least one actual repetition including at least two symbols.

In one embodiment, the information for determining the invalid symbol comprises at least one of configuration information for indicating whether each symbol is a downlink symbol and information on an invalid symbol pattern.

In one embodiment, the method further comprises receiving, from the base station, information on a joint channel estimation configuration, determining at least one actual repetition group based on the configuration information on the repetition transmission of the PUSCH, the information for determining the invalid symbol, and the information on the joint channel estimation configuration, and transmitting, to the base station, at least one DMRS according to the at least one actual repetition group.

In one embodiment, the configuration information on the repetition transmission of the PUSCH comprises at least one of a starting symbol of the PUSCH, symbol length of the PUSCH, a number of a repetition, or an PUSCH mapping type.

In accordance with another aspect of the disclosure, a method performed by a base station in a wireless communication system is provided. The method includes transmitting, to a terminal, configuration information on a repetition transmission of a physical uplink shared channel (PUSCH), transmitting, to the terminal, information for determining an invalid symbol, identifying at least one actual repetition including one symbol based on the configuration information on the repetition transmission of the PUSCH and the information for determining the invalid symbol, and receiving, from the terminal, at least one of a PUSCH or demodulation reference signal (DMRS) mapped to the at least one actual repetition including one symbol, and at least one PUSCH mapped to at least one actual repetition including at least two symbols.

In one embodiment, the method further comprises transmitting, to the terminal, information on a joint channel estimation configuration, determining at least one actual repetition group based on the configuration information on the repetition transmission of the PUSCH, the information for determining the invalid symbol, and the information on the joint channel estimation configuration, and receiving, from the terminal, at least one DMRS according to the at least one actual repetition group.

In accordance with another aspect of the disclosure, a terminal in a wireless communication system is provided. The terminal includes a transceiver, and a controller coupled with the transceiver and configured to receive, from a base station, configuration information on a repetition transmission of a physical uplink shared channel (PUSCH), receive, from the base station, information for determining an invalid symbol, identify at least one actual repetition including one symbol based on the configuration information on the repetition transmission of the PUSCH and the information for determining the invalid symbol, map at least one of a PUSCH or demodulation reference signal (DMRS) to the at least one actual repetition including one symbol, and transmit, to the base station, the at least one of the PUSCH or the DMRS mapped to the at least one actual repetition including one symbol, and at least one PUSCH mapped to at least one actual repetition including at least two symbols.

In accordance with another aspect of the disclosure, a base station in a wireless communication system is provided. The base station includes a transceiver and a controller coupled with the transceiver and configured to transmit, to a terminal, configuration information on a repetition transmission of a physical uplink shared channel (PUSCH), transmit, to the terminal, information for determining an invalid symbol, identify at least one actual repetition including one symbol based on the configuration information on the repetition transmission of the PUSCH and the information for determining the invalid symbol, and receive, from the terminal, at least one of a PUSCH or demodulation reference signal (DMRS) mapped to the at least one actual repetition including one symbol, and at least one PUSCH mapped to at least one actual repetition including at least two symbols.

According to an embodiment of the disclosure, the performance of joint channel estimation for repeated multi-uplink transmission can be enhanced, and the coverage of an uplink channel can be improved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a DMRS pattern (type 1 and type 2) used for communication between a base station and a terminal in a 5G system according to an embodiment of the disclosure;

FIG. 16 is a diagram illustrating a method for DMRS mapping of a consecutive and non-consecutive PUSCH repetitive transmission when a joint channel estimation and PUSCH repetition type B are configured for a terminal by a base station according to an embodiment of the disclosure;

FIG. 21 is a diagram illustrating a window configuration method and a DMRS mapping method for performing an AI-based joint channel estimation at the time of PUSCH repetitive transmission in a frequency division duplex (FDD) system according to an embodiment of the disclosure;

FIG. 22 is a diagram illustrating a window configuration method and a DMRS mapping method for performing an AI-based joint channel estimation at the time of PUSCH repetitive transmission in a time division duplex (TDD) system according to an embodiment of the disclosure;

Throughout the drawings, it should be noted that like reference numbers are used to depict the same or similar elements, features, and structures.

DETAILED DESCRIPTION

Figure 1:
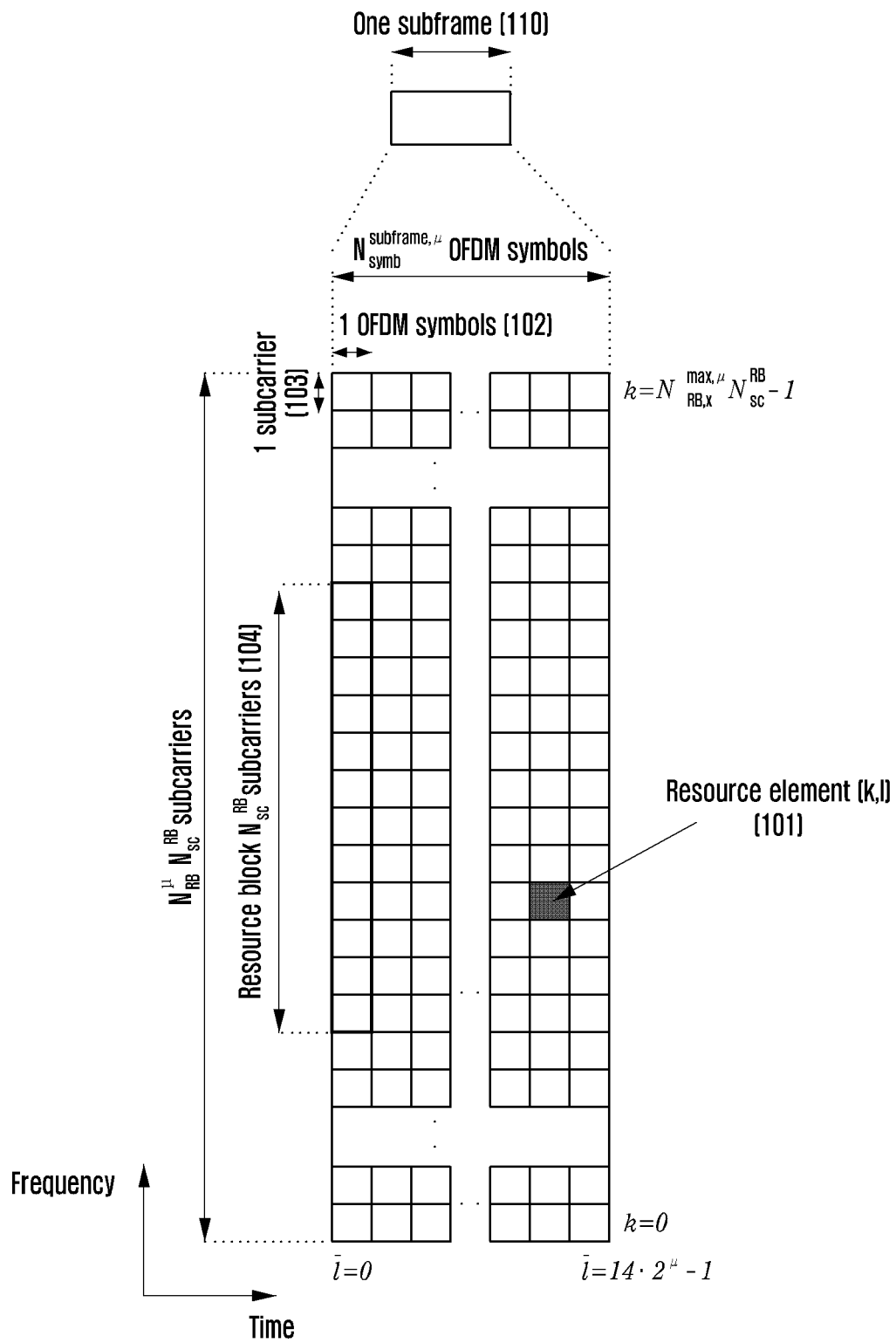
FIG. 1 is a diagram illustrating a basic structure of a time-frequency domain that is a wireless resource region in which data or a control channel is transmitted in a 5G system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink" refers to a radio link via which a base station transmits a signal to a terminal, and an "uplink" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, embodiments of the disclosure will be described in detail with reference to the accompanying drawings. Hereinafter, a method and an apparatus proposed in embodiments of the disclosure describe the embodiments of the disclosure as an example for improvement of a PUSCH coverage, but are not applied limitedly to each example. It may also be possible to use a combination of all or some of one or more embodiments proposed in the disclosure, in a frequency resource configuration method corresponding to a different channel. Therefore, embodiments of the disclosure may be applied through partial modification without departing from the scope of the disclosure through determination by a person skilled in the art.

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Wireless communication systems have developed into broadband wireless communication systems that provide a high speed and high quality packet data service including communication standards, such as high speed packet access (HSPA), long-term evolution (LTE or evolved universal terrestrial radio access (E-UTRA)), LTE-advanced (LTE-A), and LTE-Pro related to 3GPP, high rate packet data (HRPD) and ultra-mobile broadband (UMB) related to 3GPP2, 802.16e related to IEEE, and the like, beyond voice-based service provided at the initial stage.

An LTE system, which is a representative example of a broadband wireless communication system, employs an orthogonal frequency division multiplexing (OFDM) scheme for a downlink (DL), and employs a single carrier frequency division multiple access (SC-FDMA) scheme for an uplink (UL). Uplink denotes a wireless link for transmitting data or a control signal by a terminal (user equipment (UE) or mobile station (MS)) to a base station (BS or eNode B (eNB)) and downlink denotes a wireless link for transmitting data or a control signal by a base station to a terminal. In a multiple access scheme described above, generally, time-frequency resources for carrying data or control information are allocated and managed in a manner to prevent overlapping of the resources between users, that is, to establish orthogonality so as to distinguish data or control information of each user.

A 5G communication system, which is a post-LTE communication system, is required to support a service satisfying various requirements so as to freely reflect various requirements from a user and a service provider Enhanced mobile broadband (eMBB), massive machine type communication (mMTC), ultra-reliable low-latency communication (URLLC), etc. may be considered as a service for a 5G communication system.

The purpose of eMBB is to provide a more improved data rate than that supported by the conventional LTE, LTE-A, or LTE-Pro. For example, in a 5G communication system, eMBB is required to provide a peak data rate of 10 Gbps for uplink and a peak data rate of 20 Gbps for downlink in view of a single base station. Furthermore, a 5G communication system is required to provide both a peak data rate and an increased user-perceived data rate of a terminal. In order to meet these requirements described above, the improvement of various transmission/reception technologies including a further enhanced multiple antenna (multi-input multi-output (MIMO)) transmission technology may be required. In addition, while, in an LTE system, a signal is transmitted using a maximum 20 MHz transmission bandwidth within a 2 GHz band, in a 5G communication system, a frequency bandwidth wider than 20 MHz is used within a frequency band of 3-6 GHz or a frequency band of 6 GHz or higher, so that a data transfer rate required for a 5G communication system can be satisfied.

Meanwhile, mMTC has been considered to support an application service, such as the Internet of Things (IoT), in a 5G communication system. mMTC requires the support of massive terminal access in a cell, the improvement of terminal coverage, improved battery lifetime, terminal cost reduction, etc. in order to efficiently provide the Internet of Things. Since the Internet of Things is mounted in various sensors and devices to provide a communication function, mMTC is required to support a large number of terminals (e.g., 1,000,000 terminals/km$^2$) in a cell. In addition, a terminal supporting mMTC requires a wider coverage compared to other services provided in a 5G communication system because it is highly probable that the terminal is located in a radio shadow area, such as the basement of a building, which a cell fails to cover, due to the nature of the service. A terminal supporting mMTC is required to be inexpensive and to have a very long battery lifetime of, for example, 10-15 years, because it is difficult to often change the battery of the terminal.

Lastly, URLLC is a cellular-based wireless communication service which is used for a particular purpose (mission-critical). For example, a service used in remote control of robots or machinery, industrial automation, unmanned aerial vehicles, remote health care, emergency alerts, etc. may be considered therefor. Therefore, communication provided by URLLC is required to provide very low latency and very high reliability. For example, a service supporting URLLC may be required to satisfy both requirements including a wireless access latency time (air interface latency) shorter than 0.5 milliseconds and a packet error rate of 10$^{-5}$ or lower. Therefore, for a service supporting URLLC, a 5G system is required to provide a transmission time interval (TTI) shorter than those of other services, and allocate a wide domain of resources in a frequency band to secure the reliability of a communication link.

The three services of a 5G communication system (hereinafter, this can be used together with a 5G system), that is, eMBB, URLLC, and mMTC, may be multiplexed and then transmitted in a single system. In order to satisfy different requirements of the services, different transmission/reception techniques and different transmission/reception parameters may be used for the services, respectively.

Hereinafter, a frame structure of a 5G system will be described in detail with reference to the drawings.

FIG. 1 is a diagram illustrating a basic structure of a time-frequency domain that is a wireless resource region of a 5G system according to an embodiment of the disclosure.

Referring to FIG. 1, the transverse axis indicates a time domain, and the longitudinal axis indicates a frequency domain. A basic unit of the resources in the time-frequency domain is a resource element (RE) 101, and may be defined by one orthogonal frequency division multiplexing (OFDM) symbol 102 (or a discrete Fourier transform spread OFDM (DFT-s-OFDM) symbol) in the time axis and one subcarrier 103 in the frequency axis. In the frequency domain, $N_{sc}^{RB}$ number (e.g., 12) of consecutive REs may configure one resource block (RB) 104. In addition, in the time domain, $N_{symb}^{subframe}$ number of consecutive OFDM symbols may configure one subframe 110.

Figure 2:
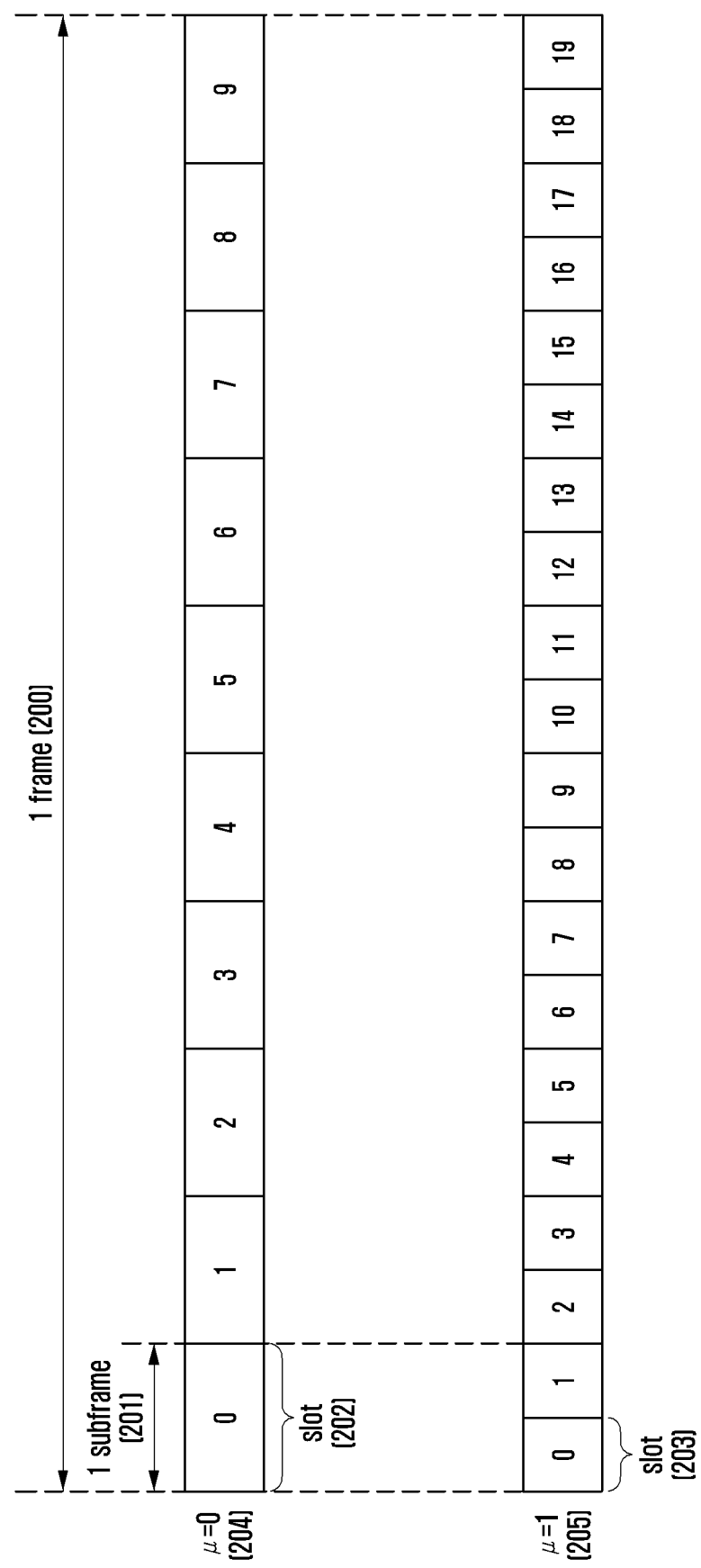
FIG. 2 is a diagram illustrating a slot structure considered in a 5G system according to an embodiment of the disclosure.

FIG. 2 is a diagram illustrating a slot structure considered in a 5G system according to an embodiment of the disclosure.

Referring to FIG. 2, an example of a structure of a frame 200, a subframe 201, and a slot 202 is illustrated. The one frame 200 may be defined as 10 ms. The one subframe 201 may be defined as 1 ms, and thus the one frame 200 may be configured by a total of 10 subframes 201. Furthermore, the one slot 202 or 203 may be defined slot as 14 OFDM symbols (i.e., the number ($N_{symb}^{slot}$) of symbols per one slot=14). The one subframe 201 may be configured by the one slot 202 or multiple slots 203, and the number of slots 202 or 203 per one subframe 201 may vary according to a configuration value µ 204 or 205 of subcarrier spacing.

In the example of FIG. 2, respective slot structures of a case of µ=0 (204) and a case of µ=1 (205) are illustrated as a subcarrier spacing configuration value. In the case of µ=0 (204), the one subframe 201 may be configured by the one slot 202, and in the case of µ=1 (205), the one subframe 201 may be configured by two slots 203. That is, the number ($N_{slot}^{subframe,\mu}$) of slots per one subframe may vary according to a configuration value µ of a subcarrier spacing, and the number ($N_{slot}^{frame,\mu}$) of slots per one frame may vary accordingly. $N_{slot}^{subframe,\mu}$ and $N_{slot}^{frame,\mu}$ according to each subcarrier spacing configuration µ may be defined as shown below in Table 1.

TABLE 1

| µ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, a demodulation reference signal (DMRS) that is one of reference signals in a 5G system will be described in detail.

A DMRS may be configured by several DMRS ports, and each port uses code division multiplexing (CDM) or frequency division multiplexing (FDM) to maintain orthogonality so as not to generate mutual interference. However, terms for DMRSs may be expressed by different terms according to a user's intent and the purpose of using reference signals. More specifically, the term of DMRSs merely corresponds to a particular example so as to easily describe technical contents of the disclosure and help the understanding of the disclosure and is not intended to limit the scope of the disclosure. That is, it is obvious to those skilled in the art to which the disclosure belongs, that the disclosure can be also carried out for reference signals based on the technical spirit of the disclosure.

FIG. 3 is a diagram illustrating a DMRS pattern (type 1 and type 2) used for communication between a base station and a terminal in a 5G system according to an embodiment of the disclosure.

Two DMRS pattern may be supported in a 5G system. The two DMRS patterns are illustrated in detail in FIG. 3. Referring to FIG. 3, reference numerals 301 and 302 indicate DMRS type 1, reference numeral 301 indicates a 1 symbol pattern, and reference numeral 302 indicates a 2 symbol pattern. DMRS type 1 indicated by reference numerals 301 and 302 in FIG. 3 corresponds to a comb 2 structure DMRS pattern, and may be configured by two CDM groups, and different CDM groups may be FDMed.

In the 1 symbol pattern indicated by reference numeral 301 in FIG. 3, frequency domain CDM may be applied to the same CDM groups to distinguish between two DMRS ports, and thus a total of four orthogonal DMRS ports may be configured. DMRS port IDs mapped to CDM groups are illustrated in the pattern indicated by reference numeral 301 in FIG. 3 (in a case of downlink, DMRS port IDs are shown by adding +1000 to the illustrated numbers). In the 2 symbol pattern indicated by reference numeral 302 in FIG. 3, time/frequency domain CDM may be applied to the same CDM groups to distinguish between four DMRS ports, and thus a total of eight orthogonal DMRS ports may be configured. DMRS port IDs mapped to CDM groups are illustrated in the pattern indicated by reference numeral 302 in FIG. 3 (in a case of downlink, DMRS port IDs are shown by adding +1000 to the illustrated numbers).

DMRS type 2 indicated by reference numerals 303 and 304 in FIG. 3 corresponds to a DMRS pattern having a structure in which frequency domain orthogonal cover codes (FD-OCC) are applied to subcarriers adjacent on frequency, and may be configured by three CDM groups, and different CDM groups may be FDMed.

In the 1 symbol pattern indicated by reference numeral 303 in FIG. 3, frequency domain CDM may be applied to the same CDM groups to distinguish between two DMRS ports, and thus a total of six orthogonal DMRS ports may be configured. DMRS port IDs mapped to CDM groups are illustrated in the pattern indicated by reference numeral 303 in FIG. 3 (in a case of downlink, DMRS port IDs are shown by adding +1000 to the illustrated numbers). In the 2 symbol pattern indicated by reference numeral 304 in FIG. 3, time/frequency domain CDM may be applied to the same CDM groups to distinguish between four DMRS ports, and thus a total of 12 orthogonal DMRS ports may be configured. DMRS port IDs mapped to CDM groups are illustrated in the pattern indicated by reference numeral 304 in FIG. 3 (in a case of downlink, DMRS port IDs are shown by adding +1000 to the illustrated numbers).

As described above, in an NR system, two different DMRS patterns (the patterns indicated by reference numerals 301 and 302 or the patterns indicated by reference numerals 303 and 304 in FIG. 3) may be configured, and whether the DMRS pattern is the one symbol pattern 301 or 303, or the two adjacent symbol patterns 302 or 304 may be also configured. Moreover, in an NR system, DMRS port numbers are scheduled, and in addition, the number of CDM groups scheduled together for PDSCH rate matching may be configured and signaled. In addition, in a case of cyclic prefix based orthogonal frequency division multiplexing (CP-OFDM), both of the two DMRS patterns described above may be supported in downlink (DL) and uplink (UL), and in a case of discrete Fourier transform spread OFDM (DFT-S-OFDM), only DMRS type 1 among the above DMRS patterns may be supported in UL. Furthermore, an additional DMRS may be supported to be configurable. A front-loaded DMRS indicates the first DMRS appearing in the most front symbol in time, and an additional DMRS indicates a DMRS appearing in a symbol after the front-loaded DMRS. In an NR system, the number of additional DMRSs may be configured to be a minimum of 0 to a maximum of 3. In addition, in a case where an additional DMRS is configured, the same pattern as a front-loaded DMRS may be assumed. More specifically, when information relating to whether the described DMRS pattern type is type 1 or type 2, information relating to whether the DMRS pattern is a one symbol pattern or a two adjacent symbol pattern, and information on a DMRS port and the number of CDM groups used therewith are indicated for a front-loaded DMRS, in a case where an additional DMRS is additionally configured, it may be assumed that the same DMRS information as the front-loaded DMRS is configured for the additional DMRS.

More specifically, a downlink DMRS configuration described above may be configured through radio resource control (RRC) signaling as shown in Table 2 below.

TABLE 2

DMRS-DownlinkConfig ::= SEQUENCE {
   dmrs-Type (DMRS type configuration) ENUMERATED
{type2} OPTIONAL, -- Need S
   dmrs-AdditionalPosition (Additional DMRS OFDM symbol configuration)
ENUMERATED {pos0, pos1, pos3} OPTIONAL, -- Need S
   maxLength (1-symbol or 2-symbol DMRS pattern-related configuration ) ENUMERATED {len2} OPTIONAL, -- Need S
     scramblingID0 (Scrambling ID0) INTEGER (0..65535)
     OPTIONAL, -- Need S
     scramblingID1 (Scrambling ID1) INTEGER (0..65535)
OPTIONAL, -- Need S
     phaseTrackingRS (PTRS configuration) SetupRelease { PTRS-DownlinkConfig } OPTIONAL, -- Need M

. . .
}

In addition, an uplink DMRS configuration described above may be configured through RRC signaling as shown in Table 3 below.

TABLE 3

DMRS-UplinkConfig ::= SEQUENCE {
   dmrs-Type (DMRS type configuration) ENUMERATED
{type2}OPTIONAL, -- Need S
   dmrs-AdditionalPosition (Additional DMRS OFDM symbol configuration)
ENUMERATED {pos0, pos1, pos3}OPTIONAL, --
Need R
   phaseTrackingRS (PTRS configuration) SetupRelease {PTRS-UplinkConfig }OPTIONAL, -- Need M
   maxLength (1-symbol or 2-symbol DMRS pattern-related configuration)
ENUMERATED {len2}OPTIONAL, -- Need S
   transformPrecodingDisabled SEQUENCE {
     scramblingID0 (Scrambling ID0) INTEGER (0..65535)
OPTIONAL, -- Need S
     scramblingID1 (Scrambling ID1) INTEGER (0..65535)
OPTIONAL, -- Need S
     . . .
} OPTIONAL, -- Need R
   transformPrecodingEnabled SEQUENCE {
     nPUSCH-Identity (Cell ID for DFT-s-OFDM)
INTEGER(0..1007) OPTIONAL, -- Need S
     sequenceGroupHopping (Sequence group hopping)
ENUMERATED
{disabled}OPTIONAL, -- Need S
     sequenceHopping (Sequence hopping) ENUMERATED {enabled}
OPTIONAL, -- Need S
     . . .
   } OPTIONAL, -- Need R
   . . .
}

Figure 4:
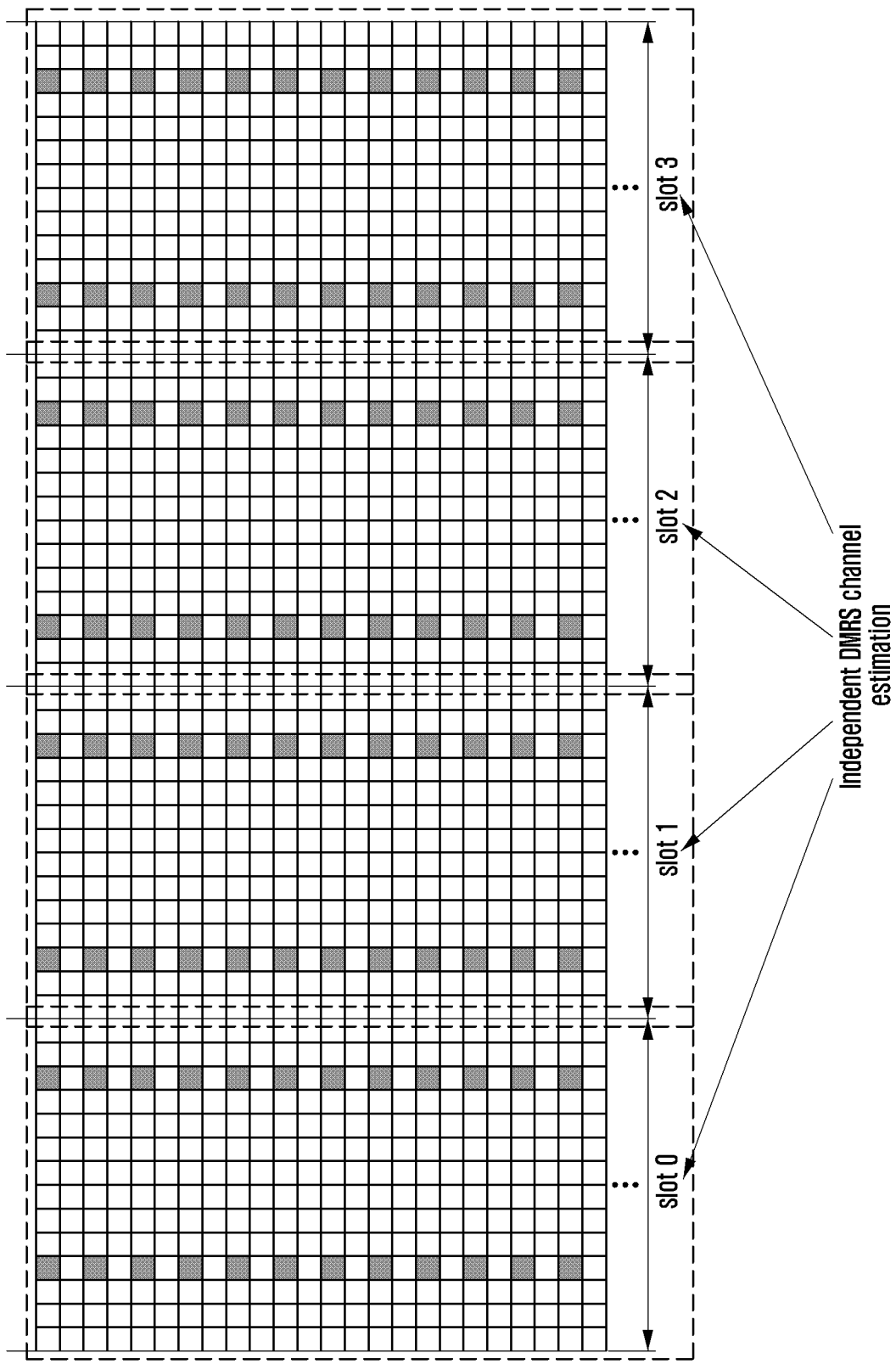
FIG. 4 is a diagram illustrating an example of channel estimation using a DMRS received in one PUSCH in a time band in a 5G system according to an embodiment of the disclosure.

FIG. 4 is a diagram illustrating an example of channel estimation using a DMRS received in one PUSCH in a time band in a 5G system according to an embodiment of the disclosure.

Referring to FIG. 4, when a channel estimation for data decoding is performed using a DMRS described above, the channel estimation may be performed within a precoding resource block group (PRG), which is a corresponding bundling unit, by using PRB bundling associated with a system band in a frequency band. In addition, in a time unit, a channel is estimated under an assumption that precoding is the same only for a DMRS received in only one PUSCH.

Figure 5:
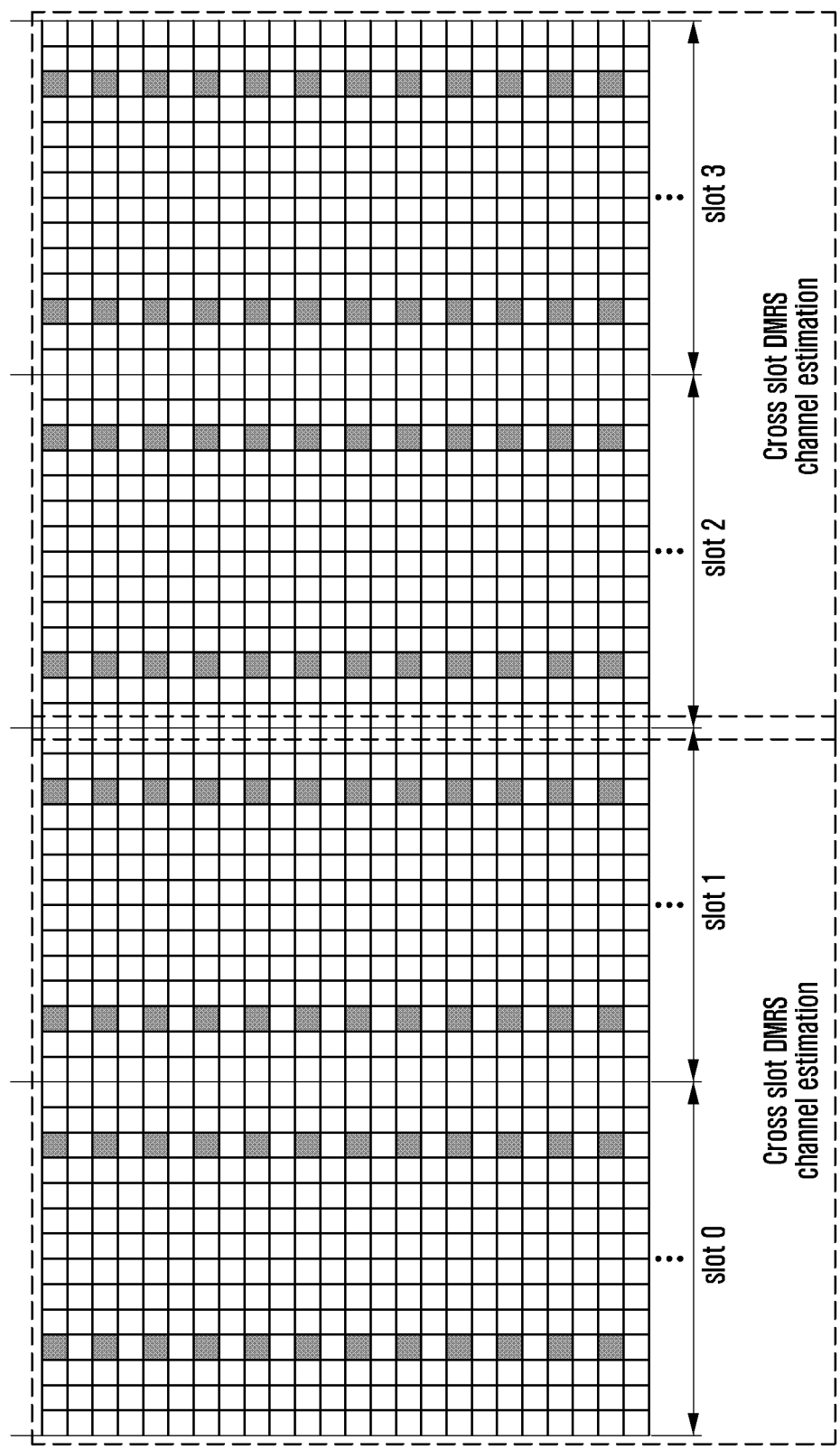
FIG. 5 is a diagram illustrating an example of joint channel estimation using DMRSs received in multiple PUSCHs in a time band in a 5G system according to an embodiment of the disclosure.

FIG. 5 is a diagram illustrating an example of joint channel estimation using DMRSs received in multiple PUSCHs in a time band in a 5G system according to an embodiment of the disclosure.

Referring to FIG. 5, in a 5G system, a base station may jointly estimate channels using DMRSs received in multiple PUSCHs in a time band, so as to decode data of the multiple PUSCHs. In order to perform a joint channel estimation for a PUSCH repetitive transmission received by the base station, a terminal may maintain the constancy (or consistency) of PUSCH transmission power between PUSCH repetitive transmissions to be subject to a joint channel estimation, and the continuity of a phase, and also configure a PUSCH repetitive transmission to be performed through beams having the same precoding. In order for the terminal to jointly estimate channels with respect to DMRSs transmitted in multiple PUSCHs, the base station may configure, for the terminal, a joint channel estimation including the constancy (or consistency) of PUSCH transmission power, the continuity of a phase, and configuration of beams having the same precoding through higher layer signaling (e.g., PUSCH-Config or PUSCH-TimeDomainResourceAllocation of RRC) and L1 signaling (e.g., DCI format 0_0 and DCI format 0_1).

For example, a separate parameter (e.g., pusch-numberof-RepetitionsForJointCE) for controlling a joint channel estimation may be included in PUSCH-Config or PUSCH-TimeDomainResourceAllocation, or a separate RRC message for configuring a joint channel estimation may be configured to configure the number of multiple PUSCHs to be subject to joint channel estimation, or a resource allocation method. Alternatively, the number of multiple PUSCHs to be subject to joint channel estimation, or a resource allocation for multiple PUSCH transmissions may be dynamically controlled through DCI format 0_0 or DCI format 0_1. Alternatively, a joint channel estimation may be configured through a combination of higher layer signaling and L1 signaling described above.

Through the configuration method described above, the terminal may transmit multiple PUSCHs for joint channel estimation. Referring to FIG. 5 similarly to FIG. 4, when a channel estimation for data decoding is performed using a DMRS satisfying the condition, the channel estimation may be performed within a precoding resource block group (PRG), which is a corresponding bundling unit, by using PRB bundling associated with a system band in a frequency band. Additionally, the base station may jointly estimate channels by using a DMRS received in one or more PUSCHs in a particular time unit. Therefore, it is possible to perform channel estimation based on several DMRSs of multiple PUSCHs in a time band, and thus the performance of channel estimation can be improved. Particularly, for coverage improvement, even when the performance of data decoding is good, the performance of channel estimation can be bottlenecked, and thus the performance of channel estimation is very important.

Hereinafter, a method for allocating time domain resources to a data channel in a 5G communication system will be described. A base station may configure, for a terminal, a table relating to time domain resource allocation information for a downlink data channel (physical downlink shared channel, PDSCH) and an uplink data channel (physical uplink shared channel, PUSCH) through higher layer signaling (e.g., RRC signaling).

The base station may configure, for a PDSCH, a table configured by a maximum of 16 entries (maxNrofDL-Allocations=16), and may configure, for a PUSCH, a table configured by a maximum of 16 entries (maxNrofUL-Allocations=16). Time domain resource allocation information may include, for example, PDCCH-to-PDSCH slot timing (a time interval expressed in the units of slots, between a time point at which a PDCCH is received, and a time point at which a PDSCH scheduled by the received PDCCH is transmitted, the timing is indicated by K0) or PDCCH-to-PUSCH slot timing (i.e., a time interval expressed in the units of slots, between a time point at which a PDCCH is received, and a time point at which a PUSCH scheduled by the received PDCCH is transmitted, the timing is indicated by K2), information relating to the starting symbol position and the length of a PDSCH or a PUSCH scheduled in a slot, a mapping type of a PDSCH or a PUSCH, and the like. For example, time domain resource allocation information for a PDSCH may be configured for the terminal through an RRC signal as shown in Table 4 below.

TABLE 4

PDSCH-TimeDomainResourceAllocationList information element
PDSCH-TimeDomainResourceAllocationList ::= SEQUENCE
(SIZE(1..maxNrofDL-Allocations)) OF PDSCH-
TimeDomainResourceAllocation
PDSCH-TimeDomainResourceAllocation ::= SEQUENCE {
  k0 INTEGER(0..32)
OPTIONAL, -- Need S
  (PDCCH-to-PDSCH timing, slot unit)
mappingType ENUMERATED {typeA, typeB},
  (PDSCH mapping type)
startSymbolAndLength INTEGER (0..127)
(PDSCH starting symbol and length)
}

In addition, for example, time domain resource allocation information for a PUSCH may be configured for the terminal through an RRC signal as shown in Table 5 below.

TABLE 5

PUSCH-TimeDomainResourceAllocation information element
PUSCH-TimeDomainResourceAllocationList ::= SEQUENCE
(SIZE(1..maxNrofUL-Allocations)) OF PUSCH-
TimeDomainResourceAllocation
PUSCH-TimeDomainResourceAllocation ::= SEQUENCE {
  k2 INTEGER(0..32) OPTIONAL, -- Need S
  (PDCCH-to-PUSCH timing, slot unit)
  mappingType ENUMERATED {typeA, typeB},
  (PUSCH mapping type)
  startSymbolAndLength INTEGER (0..127)
  (PUSCH starting symbol and length)
}

The base station may transmit, to the terminal, one of the entries of a table relating to the time domain resource allocation information through L1 signaling (e.g., downlink control information (DCI)) (e.g., the base station may indicate same through a "time domain resource allocation" field in DCI). The terminal may obtain time domain resource allocation information relating to a PDSCH or PUSCH, based on DCI received from the base station.

Hereinafter, transmission of an uplink data channel (a physical uplink shared channel (PUSCH)) in a 5G system will be described in detail. PUSCH transmission may be dynamically scheduled by a UL grant in DCI, or may be operated by configured grant Type 1 or configured grant Type 2. Dynamic scheduling for PUSCH transmission may be indicated by, for example, DCI format 0_0 or DCI format 0_1.

Configured grant Type 1 PUSCH transmission may be semi-statically configured through reception of configuredGrantConfig including rrc-ConfiguredUplinkGrant shown in Table 6 through higher signaling without reception of a UL grant in DCI. Configured grant Type 2 PUSCH transmission may be semi-persistently scheduled by an UL grant in DCI after reception of configuredGrantConfig not including rrc-ConfiguredUplinkGrant shown in Table 6 through higher signaling. In a case where a PUSCH transmission is operated by a configured grant, parameters applied to the PUSCH transmission may be applied through configuredGrantConfig, which is higher signaling of Table 6, except for particular parameters (e.g., dataScramblingIdentityPUSCH, txConfig, codebookSubset, maxRank, and scaling of UCI-OnPUSCH) provided by pusch-Config shown in Table 7, which is higher signaling. For example, when transformPrecoder in configuredGrantConfig, which is higher signaling of Table 6, is provided to the terminal, the terminal may apply tp-pi2BPSK in pusch-Config of Table 7 to PUSCH transmission operated by a configured grant.

TABLE 6

ConfiguredGrantConfig
ConfiguredGrantConfig ::= SEQUENCE {
   frequencyHopping ENUMERATED {intraSlot, interSlot}
OPTIONAL, -- Need S,
   cg-DMRS-Configuration DMRS-UplinkConfig,
   mcs-Table ENUMERATED {qam256, qam64LowSE}
OPTIONAL, -- Need S
   mcs-TableTransformPrecoder ENUMERATED {qam256, qam64LowSE} OPTIONAL, -- Need S
   uci-OnPUS CH SetupRelease {CG-UCI-OnPUSCH }
OPTIONAL, -- Need M
   resourceAllocation ENUMERATED {resourceAllocationType0, resourceAllocationType1, dynamicSwitch
      rbg-Size ENUMERATED {config2}
OPTIONAL, -- Need S
   powerControlLoopToUse ENUMERATED {n0, n1
   p0-PUSCH-Alpha P0-PUSCH-AlphaSetId,
   transformPrecoder ENUMERATED {enabled, disabled}
OPTIONAL, -- Need S
   nrofHARQ-Processes INTEGER(1..16),
   repK ENUMERATED {n1, n2, n4, n8}
   repK-RV ENUMERATED {s1-0231, s2-0303, s3-0000}
OPTIONAL, -- Need R
   periodicity ENUMERATED {
      sym2, sym7, sym1x14, sym2x14, sym4x14,
sym5x14, sym8x14, sym10x14, sym16x14, sym20x14,
      sym32x14, sym40x14, sym64x14, sym80x14,
sym128x14, sym160x14, sym256x14, sym320x14, sym512x14,
      sym640x14, sym1024x14, sym1280x14,
sym2560x14, sym5120x14,
      sym6, sym1x12, sym2x12, sym4x12, sym5x12,
sym8x12, sym10x12, sym16x12, sym20x12, sym32x12,
      sym40x12, sym64x12, sym80x12, sym128x12,
sym160x12, sym256x12, sym320x12, sym512x12, sym640x12,
      sym1280x12, sym2560x12
   },
   configuredGrantTimer INTEGER (1..64)
OPTIONAL, -- Need R
   rrc-ConfiguredUplinkGrant SEQUENCE {
      timeDomainOffset INTEGER (0..5119),
      timeDomainAllocation INTEGER (0..15),
      frequencyDomainAllocation BIT STRING (SIZE(18)),
      antennaPort INTEGER (0..31),
      dmrs-SeqInitialization INTEGER (0..1)
OPTIONAL, -- Need R
      precodingAndNumberOfLayers INTEGER (0..63),
      srs-ResourceIndicator INTEGER (0..15)
OPTIONAL, -- Need R
      mcsAndTBS INTEGER (0..31),
      frequencyHoppingOffset INTEGER (1..
maxNrofPhysicalResourceBlocks-1) OPTIONAL, -- Need R
      pathlossReferenceIndex INTEGER (0..maxNrofPUSCH-PathlossReferenceRSs-1),
   . . .
   }
OPTIONAL, -- Need R
   . . .
}

Next, a PUSCH transmission method is described. A DMRS antenna port for PUSCH transmission may be the same as an antenna port for sounding reference signal (SRS) transmission. PUSCH transmission may follow each of a codebook-based transmission method and a non-codebook-based transmission method according to whether the value of txConfig in pusch-Config of Table 7, which is higher signaling, is a "codebook" or a "nonCodebook". As described above, PUSCH transmission may be dynamically scheduled through DCI format 0_0 or DCI format 0_1, and may be semi-statically configured by a configured grant.

If scheduling for a PUSCH transmission is indicated to the terminal through DCI format 0_0, the terminal may perform beam configuration for the PUSCH transmission by using pucch-spatialRelationInfoID corresponding to a UE-specific (dedicated) PUCCH resource having the lowest ID in an uplink bandwidth part (BWP) activated in a serving cell. The PUSCH transmission may be performed based on a single antenna port. The terminal may not expect, through DCI format 0_0, scheduling for PUCCH transmission within a BWP in which a PUCCH resource including pucch-spatialRelationInfo is not configured. If txConfig in pusch-Config of Table 7 is not configured for the terminal, the terminal may not expect to be scheduled through DCI format 0_1.

TABLE 7

PUSCH-Config
PUSCH-Config ::= SEQUENCE {
   dataScramblingIdentityPUSCH INTEGER (0..1023)
OPTIONAL, -- Need S
   txConfig ENUMERATED {codebook, nonCodebook}
OPTIONAL, -- Need S
   dmrs-UplinkForPUSCH-MappingTypeA SetupRelease {DMRS-UplinkConfig }OPTIONAL, -- Need M
   dmrs-UplinkForPUSCH-MappingTypeB SetupRelease {DMRS-UplinkConfig }OPTIONAL, -- Need M
   pusch-PowerControl OPTIONAL, -- Need M
   frequencyHopping ENUMERATED {intraSlot, interSlot}
OPTIONAL, -- Need S
   frequencyHoppingOffsetLists SEQUENCE (SIZE (1..4)) OF INTEGER (1..maxNrofPhysicalResourceBlocks-1)
OPTIONAL, -- Need M
   resourceAllocation ENUMERATED {resourceAllocationType0, resourceAllocationType1, dynamicSwitch
      pusch-TimeDomainAllocationList SetupRelease {PUS CH-TimeDomainResourceAllocationList }OPTIONAL, -- Need M
      pusch-AggregationFactor ENUMERATED {n2, n4, n8 }
OPTIONAL, -- Need S
      mcs-Table ENUMERATED {qam256, qam64LowSE}
OPTIONAL, -- Need S
      mcs-TableTransformPrecoder ENUMERATED {qam256, qam64LowSE}
OPTIONAL, -- Need S
      transformPrecoder ENUMERATED {enabled, disabled}
OPTIONAL, -- Need S
   codebookSubset ENUMERATED {fullyAndPartialAndNonCoherent, partialAndNonCoherent,nonCoherent}
      OPTIONAL, -- Cond codebookBased
      maxRank INTEGER (1..4) OPTIONAL, -- Cond codebookBased
      rbg-Size ENUMERATED {config2}
OPTIONAL, -- Need S
   uci-OnPUSCH SetupRelease {UCI-OnPUSCH}
OPTIONAL, -- Need M
   tp-pi2BPSK ENUMERATED {enabled}
OPTIONAL, -- Need S
   . . .
}

Next, codebook-based PUSCH transmission is described. As described above, codebook-based PUSCH transmission may be dynamically scheduled through DCI format 0_0 or DCI format 0_1, and may be semi-statically operated by a configured grant. If a codebook-based PUSCH transmission is dynamically scheduled by DCI format 0_1, or is semi-statically operated by a configured grant, the terminal may determine a precoder for the PUSCH transmission, based on an SRS resource indicator (SRI), a transmission precoding matrix indicator (TPMI), and a transmission rank (the number of PUSCH transmission layers).

The SRI may be given through an SRS resource indicator, which is a field in DCI, or may be configured through srs-ResourceIndicator which is higher signaling. At least one SRS resource may be configured for the terminal at the time of codebook-based PUSCH transmission, and for example, up to two SRS resources may be configured. In a case where an SRI is provided to the terminal through DCI, an SRS resource indicated by the corresponding SRI may indicate an SRS resource corresponding to the SRI among SRS resources transmitted before a PDCCH including the corresponding to SRI. In addition, a TPMI and a transmission rank may be given through precoding information and number of layers, which is a field in DCI, or may be configured by precodingAndNumberOfLayers which is higher signaling. A TPMI may be used to indicate a precoder applied to PUSCH transmission.

A precoder to be used for PUSCH transmission may be selected from in an uplink codebook having the same number of antenna ports as the value of nrofSRS-Ports in SRS-Config which is higher signaling. In a codebook-based PUSCH transmission, the terminal may determine a codebook subset, based on a TPMI and codebookSubset in pusch-Config which is higher signaling. codebookSubset in pusch-Config which is higher signaling may be configured to be one of "fullyAndPartialAndNonCoherent", "partialAndNonCoherent", or "nonCoherent", based on UE capability reported to the base station by the terminal.

If the terminal reports "partialAndNonCoherent" as UE capability, the terminal may not expect that the value of codebookSubset which is higher signaling is configured to be "fullyAndPartialAndNonCoherent". In addition, if the terminal reports "nonCoherent" as UE capability, the terminal may not expect that the value of codebookSubset which is higher signaling is configured to be "fullyAndPartialAndNonCoherent" or "partialAndNonCoherent". In a case where nrofSRS-Ports in SRS-ResourceSet which is higher signaling indicates two SRS antenna ports, the terminal may not expect that the value of codebookSubset which is higher signaling is configured to be "partialAndNonCoherent".

One SRS resource set configured to have "codebook" as the value of usage in SRS-ResourceSet which is higher signaling may be configured for the terminal, and one SRS resource in the corresponding SRS resource set may be indicated through an SRI. If several resources in an SRS resource set configured to have "codebook" as the value of usage in SRS-ResourceSet which is higher signaling are configured, the terminal may expect that the value of nrofSRS-Ports in SRS-Resource which is higher signaling is configured to be identical for all the SRS resources.

The terminal may transmit, to the base station, one or multiple SRS resources included in an SRS resource set configured to have "codebook" as the value of usage according to higher signaling, and the base station may select one from among the SRS resources transmitted by the terminal, and indicates the terminal to perform a PUSCH transmission by using transmission beam information of the corresponding SRS resource. In a codebook-based PUSCH transmission, an SRI may be used as information for selecting the index of one SRS resource, and may be included in DCI. Additionally, the base station may transmit information indicating a TPMI and a rank to be used by the terminal for a PUSCH transmission, after including the information in DCI. The terminal may use an SRS resource indicated by the SRI, to apply a precoder indicated by a TPMI and a rank indicated based on a transmission beam of the corresponding SRS resource, so as to perform a PUSCH transmission.

Next, non-codebook-based PUSCH transmission is described. Non-codebook-based PUSCH transmission may be dynamically scheduled through DCI format 0_0 or DCI format 0_1, or may be semi-statically operated by a configured grant. In a case where at least one SRS resource is configured in an SRS resource set configured to have "nonCodebook" as the value of usage in SRS-ResourceSet which is higher signaling, a non-codebook-based PUSCH transmission may be scheduled for the terminal through DCI format 0_1.

With respect to an SRS resource set configured to have "nonCodebook" as the value of usage in SRS-ResourceSet which is higher signaling, a non-zero power (NZP) CSI-RS resource associated with one SRS resource set may be configured for the terminal. The terminal may perform a calculation for a precoder for SRS transmission through a measurement of an NZP CSI-RS resource configured in association with an SRS resource set. In a case where a difference between the first symbol of an aperiodic SRS transmission by the terminal, and the last reception symbol of an aperiodic NZP CSI_RS resource associated with an SRS resource set is smaller than a particular symbol (e.g., 42 symbols), the terminal may not expect that information on a precoder for an SRS transmission is updated.

If the value of resourceType in SRS-ResourceSet which is higher signaling is configured to be "aperiodic", an NZP CSI-RS associated with the SRS-ResourceSet may be indicated by SRS request which is a field in DCI format 0_1 or DCI format 1_1. In a case where an NZP CSI-RS resource associated with SRS-ResourceSet is an aperiodic NZP CSI resource, and the value of SRS request which is a field in DCI format 0_1 or DCI format 1_1 is not "00", existence of an NZP CSI-RS associated with SRS-ResourceSet may be indicated. The corresponding DCI is required not to indicate scheduling of a cross carrier or a cross BWP. In addition, if the value of SRS request indicates existence of an NZP CSI-RS, the corresponding NZP CSI-RS may be positioned in a slot in which a PDCCH including an SRS request field is transmitted. TCI states configured for a scheduled subcarrier may not be configured to be QCL-TypeD.

If a periodic or semi-persistent SRS resource set is configured, an NZP CSI-RS associated with the SRS resource set may be indicated through associatedCSI-RS in SRS-ResourceSet which is higher signaling. With respect to a non-codebook-based transmission, the terminal may not expect that spatialRelationInfo which is higher signaling for an SRS resource and associatedCSI-RS in SRS-ResourceSet which is higher signaling are configured together.

In a case where multiple SRS resources are configured for the terminal, the terminal may determine a precoder and a transmission rank to be applied to a PUSCH transmission, based on an SRI indicated by the base station. The SRI may be indicated through an SRS resource indicator, which is a field in DCI, or may be configured through srs-ResourceIndicator which is higher signaling. Similarly to a codebook-based PUSCH transmission described above, in a case where an SRI is provided to the terminal through DCI, an SRS resource indicated by the corresponding SRI may indicate an SRS resource corresponding to the SRI among SRS resources transmitted before a PDCCH including the corresponding to SRI. The terminal may use one or multiple SRS resources for an SRS transmission, and a maximum number of SRS resources and a maximum number of SRS resources which can be jointly transmitted in the same symbol in one SRS resource set may be determined based on UE capability reported by the terminal to the base station. The SRS resources jointly transmitted by the terminal may occupy the same RB. The terminal may configure one SRS port for each SRS resource. The number of SRS resource sets configured to have "nonCodebook" as the value of usage in SRS-ResourceSet which is higher signaling may be configured to be only one, and the number of SRS resources for non-codebook-based PUSCH transmission can be configured to up to four.

The base station may transmit one NZP CSI-RS associated with an SRS resource set to the terminal, and the terminal may calculate a precoder to be used at the time of transmission of one or multiple SRS resources in the corresponding SRS resource set, based on a result of measurement performed at the time of reception of the corresponding NZP CSI-RS. The terminal may apply the calculated precoder when transmitting, to the base station, one or multiple SRS resources in an SRS resource set configured to have "nonCodebook" as usage, and the base station may select one or multiple SRS resources among the received one or multiple SRS resources. In a non-codebook-based PUSCH transmission, an SRI may indicate an index which can represent one or a combination of multiple SRS resources, and the SRI may be included in DCI. The number of SRS resources indicated by an SRI transmitted by the base station may be the number of transmission layers of a PUSCH, and the terminal may transmit a PUSCH by applying a precoder applied to an SRS resource transmission to each of the layers.

Next, PUSCH repetitive transmission is described. When a PUSCH transmission is scheduled for the terminal through DCI format 0_1 in a PDCCH including a CRC scrambled with a C-RNTI, an MCS-C-RNTI, or a CS-RNTI, if pusch-AggregationFactor which is higher layer signaling is configured for the terminal, the same symbol allocation may be applied in as many consecutive slots as pusch-Aggregation-Factor, and the PUSCH transmission may be limited to a single rank transmission. For example, the terminal is required to repeat the same transport block (TB) in as many consecutive slots as pusch-AggregationFactor, and apply the same symbol allocation to each of the slots. Table 8 shows a redundancy version applied to a PUSCH repetitive transmission for each slot. If a PUSCH repetitive transmission in multiple slots is scheduled for the terminal through DCI format 0_1, and at least one symbol among the slots in which the PUSCH repetitive transmission is performed is indicated to be a downlink symbol according to information of tdd-UL-DL-ConfigurationCommon or tdd-UL-DL-ConfigurationDedicated which is higher layer signaling, the terminal may not perform PUSCH transmission in a slot in which the corresponding symbol is positioned.

TABLE 8

| $rv_{Id}$ indicated by the DCI scheduling the PUSCH | $rv_{Id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Hereinafter, repetitive transmission of an uplink data channel (PUSCH) in a 5G system will be described in detail.

A 5G system supports two types including PUSCH repetition type A and PUSCH repetition type B as a method for repetitive transmission of an uplink data channel. One of PUSCH repetition type A or B may be configured for the terminal through higher layer signaling.

PUSCH Repetition Type A

As described above, the starting symbol and the length of an uplink data channel may be determined in one slot by the time domain resource allocation method, and the base station may transmit the number of repetitive transmissions to the terminal through higher layer signaling (e.g., RRC signaling) or L1 signaling (e.g., DCI).

The terminal may repeatedly transmit an uplink data channel having the same starting symbol and the same length as the configured uplink data channel in consecutive slots, based on the number of repetitive transmissions received from the base station. The terminal may omit uplink data channel transmission in a slot configured as downlink for the terminal by the base station or in a corresponding slot of a case where at least one symbol among symbols in a slot configured for the terminal for uplink data channel repetitive transmission is configured as downlink. That is, the uplink data channel transmission may be included in the number of repetitive transmissions of the uplink data channel, but may not be performed.

PUSCH Repetition Type B

As described above, the starting symbol and the length of an uplink data channel may be determined in one slot by the time domain resource allocation method, and the base station may transmit numberofrepetitions, which is the number of repetitive transmissions, to the terminal through higher signaling (e.g., RRC signaling) or L1 signaling (e.g., DCI).

First, a nominal repetition of the uplink data channel may be determined as below based on the configured starting symbol and the length of then uplink data channel. The nominal repetition may indicate a resource of a symbol configured for PUSCH repetitive transmission by the base station, and the terminal may determine a resource usable as uplink in the configured nominal repetition. In this case, a slot in which the n-th nominal repetition starts may be given by $$K_s + \left\lfloor \frac{S + n \cdot L}{N_{symb}^{slot}} \right\rfloor,$$

and a symbol in which the nominal repetition starts in the starting slot may be given by $\mod(S+n \cdot L, N_{symb}^{slot})$. A slot in which the n-th nominal repetition ends may be given by $$K_s + \left\lfloor \frac{S + (n+1) \cdot L - 1}{N_{symb}^{slot}} \right\rfloor,$$

and a symbol in which the nominal repetition ends in the last slot may be given by $\mod(S+(n+1) \cdot L-1, N_{symb}^{slot})$. Herein, n=0, . . . , numberofrepetitions−1, S may denote the configured starting symbol of the uplink data channel, and L may denote the configured symbol length of the uplink data channel $K_s$ may indicate a slot in which the PUSCH transmission starts, and $N_{symb}^{slot}$ may indicate the number of symbols per slot.

The terminal determines an invalid symbol for PUSCH repetition type B. A symbol configured as downlink by tdd-UL-DL-ConfigurationCommon or tdd-UL-DL-ConfigurationDedicated may be determined as an invalid symbol for PUSCH repetition type B. Additionally, an invalid symbol may be configured based on a higher layer parameter (e.g., InvalidSymbolPattern). For example, an invalid symbol may be configured by the higher layer parameter (e.g., InvalidSymbolPattern) providing a symbol level bitmap over one slot or two slots. A part indicated by 1 in the bitmap may indicate an invalid symbol. Additionally, the period and the pattern of the bitmap may be configured through a higher layer parameter (e.g., periodicityAndPattern). In a case where a higher layer parameter (e.g., InvalidSymbolPattern) is configured, if the parameter InvalidSymbolPatternIndicator-ForDCIFormat0_1 or InvalidSymbolPatternIndicator-ForDCIFormat0_2 indicates 1, the terminal may apply an invalid symbol pattern, and if same indicates 0, the terminal may not apply an invalid symbol pattern. If a higher layer parameter (e.g., InvalidSymbolPattern) is configured, and the parameter InvalidSymbolPatternIndicator-ForDCIFormat0_1 or InvalidSymbolPatternIndicator-ForDCIFormat0_2 is not configured, the terminal may apply an invalid symbol pattern.

after an invalid symbol is determined in each nominal repetition, the terminal may consider, as valid symbols, symbols remaining after excluding the determined invalid symbol. If one or more valid symbols are included in each nominal repetition, the nominal repetition may include one or more actual repetitions. Each actual repetition may indicate a symbol actually used for PUSCH repetitive transmission among symbols configured as the configured nominal repetition, and may include a consecutive set of valid symbols which can be used for PUSCH repetition type B in one slot. The terminal may omit actual repetition transmission in a case where an actual repetition having one symbol is configured to be valid except for a case where the configured symbol length (L) of the uplink data channel is equal to 1 (L=1). A redundancy version is applied according to a redundancy version pattern configured for each n-th actual repetition.

Figure 6:
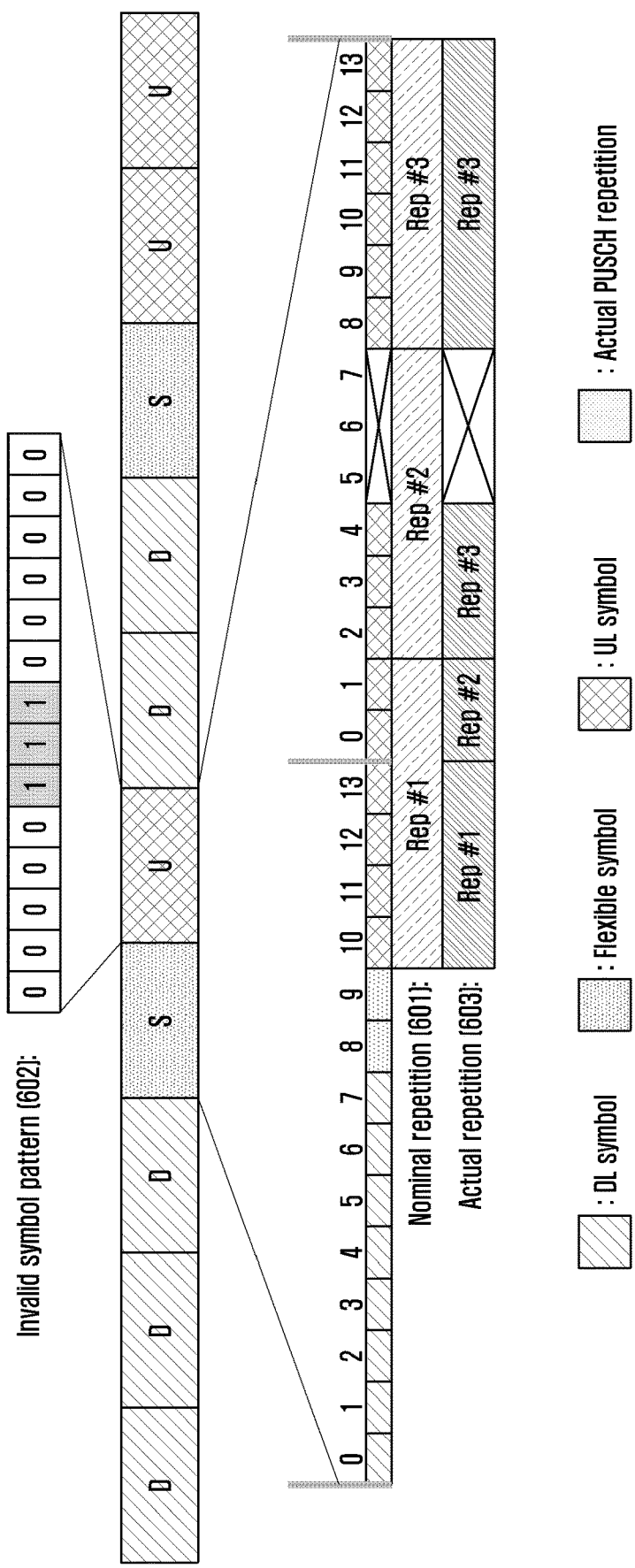
FIG. 6 is a diagram illustrating an example of PUSCH repetition type B in a 5G system according to an embodiment of the disclosure.

FIG. 6 is a diagram illustrating an example of PUSCH repetition type B in a 5G system according to an embodiment of the disclosure.

Referring to FIG. 6, in a case where, for the terminal, the starting symbol S of an uplink data channel is configured to be 10, the length L is configured to be 6, and the number of repetitive transmissions is configured to be 3, nominal repetitions may occur in two consecutive slots (as indicated by reference numeral 601). For invalid symbol determination, the terminal may determine, as an invalid symbol, a symbol configured as a downlink symbol in each nominal repetition, and may determine, as invalid symbols, symbols configured to be 1 in an invalid symbol pattern 602. In a case where valid symbols other than an invalid symbol in each nominal repetition are configured by one or more consecutive symbols in one slot, the terminal may configure an actual repetition configured by the one or more consecutive symbols in the one slot (as indicated by reference numeral 603).

Hereinafter, frequency hopping of an uplink data channel (a physical uplink shared channel (PUSCH)) in a 5G system will be described in detail.

5G supports, as methods for frequency hopping of an uplink data channel, two methods for each PUSCH repetition type. First, in PUSCH repetition type A, intra-slot frequency hopping and inter-slot frequency hopping may be supported, and in PUSCH repetition type B, inter-repetition frequency hopping and inter-slot frequency hopping may be supported.

An intra-slot frequency hopping method supported in PUSCH repetition type A is a method in which the terminal changes allocated frequency domain resources in two hops in one slot by a configured frequency offset, and performs transmission. In intra-slot frequency hopping, the starting RB of each hop may be represented by Equation 1.

$$RB_{start} = \begin{cases} RB_{start} & i = 0 \\ (RB_{start} + RB_{offset}) \bmod N_{BWP}^{size} & i = 1 \end{cases} \quad \text{Equation 1}$$

In Equation 1, i=0 and i=1 may indicate the first hop and the second hop, respectively, and $RB_{start}$ may indicate the starting RB within a UL BWP, and may be calculated by a frequency resource allocation method. $RB_{offset}$ indicates a frequency offset between two hops through a higher layer parameter. The number of symbols of the first hop may be represented by $\lfloor N_{symb}^{PUSCH,s}/2 \rfloor$, and the number of symbols of the second hop may be represented by $N_{symb}^{PUSCH,s} - \lfloor N_{symb}^{PUSCH,s}/2 \rfloor$. $N_{symb}^{PUSCH,s}$ is the length of a PUSCH transmission in one slot, and may be represented by the number of OFDM symbols.

Next, an inter-slot frequency hopping method supported in PUSCH repetition types A and B is a method in which the terminal changes allocated frequency domain resources in each slot by a configured frequency offset, and performs transmission. In inter-slot frequency hopping, the starting RB for $n_s^\mu$ slot may be represented by Equation 2.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{Equation 2}$$

In Equation 2, $n_s^\mu$ may indicate the current slot number in multi-slot PUSCH transmission, and $RB_{start}$ may indicate the starting RB within a UL BWP, and may be calculated by a frequency resource allocation method. $RB_{offset}$ may represent a frequency offset between two hops through a higher layer parameter.

Next, an inter-repetition frequency hopping method supported in PUSCH repetition type B is to move allocated frequency domain resources of one or multiple actual repetitions in each nominal repetition by a configured frequency offset, and perform transmission. RBstart(n), which is the index of the starting RB on the frequency domain with respect to one or multiple actual repetitions in the n-th nominal repetition, may follow Equation 3.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{Equation 3}$$

In Equation 3, n may indicate the index of a nominal repetition, and $RB_{offset}$ may indicate an RB offset between two hops through a higher layer parameter.

The disclosure describes a method for resource allocation and a method for DMRS mapping when a PUSCH repetitive transmission configuration and a joint channel estimation are configured in a 5G communication system. Joint channel estimation for multi-PUSCH repetitive transmission according to an embodiment of the disclosure may be used to improve the performance of channel estimation and enhance the coverage of a channel.

An operation method of a terminal for improving the performance of a joint channel estimation for multi-PUSCH repetitive transmission, based on a repetitively transmitted physical uplink shared channel (PUSCH) according to an embodiment of the disclosure may include: receiving, from a base station, repetitive transmission configuration information for PUSCH repetitive transmission and joint channel estimation configuration information; receiving, from the base station, PUSCH resource allocation configuration information and demodulation reference signal (DMRS) configuration information for channel estimation; and based on the configured resource allocation information and the configured DMRS configuration information, allocating a resource and performing DMRS mapping for a PUSCH repetitive transmission to be subject to a joint channel estimation according to the configured resource allocation and DMRS mapping method, so as to perform the repetitive transmission to the base station.

An operation method of a base station for improving the performance of a joint channel estimation for multi-PUSCH repetitive transmission, based on a repetitively transmitted PUSCH according to an embodiment of the disclosure may include: transmitting, to a terminal, repetitive transmission configuration information for PUSCH repetitive transmission and joint channel estimation configuration information; transmitting, to the terminal, PUSCH resource allocation configuration information and DMRS configuration information for channel estimation; based on the resource allocation configuration information and the DMRS configuration information, receiving the repetitively transmitted PUSCH from the terminal; and performing a joint channel estimation for the received multi-PUSCH repetitive transmission.

In accordance with the disclosure, a method for resource allocation and a method for DMRS mapping when a joint channel estimation for a PUSCH repetitive transmission is configured is described through an embodiment.

This embodiment provides a method for resource allocation and a method for DMRS mapping when a joint channel estimation for a PUSCH repetitive transmission is configured in a 5G system. The method for resource allocation and DMRS mapping according to the embodiment of the disclosure may be applied to improve an uplink coverage through precise channel estimation. In the following description of overall embodiments of the disclosure, PUSCH repetitive transmission is present as an example. However, this merely corresponds to an example, and does not limit the scope of the disclosure, and an embodiment of the disclosure can be applied to even a case of PUSCH/PUCCH repetitive transmission by being defined/configured in advance or through signaling between a base station and a terminal. In addition, a random value defined/configured in advance or configured through signaling between a base station and a terminal in a method for resource allocation and DMRS mapping applied to a PUSCH repetitive transmission for which joint channel estimation to be described hereinafter is configured may be configured by one or a combination of a symbol/slot length, an interval between PUSCH/PUCCH transmissions, and the number of PUSCH/PUCCH transmissions.

First Embodiment

The first embodiment of the disclosure provides a method for resource allocation of a PUSCH repetitive transmission for which a joint channel estimation for PUSCH repetitive transmission is configured.

Figure 7:
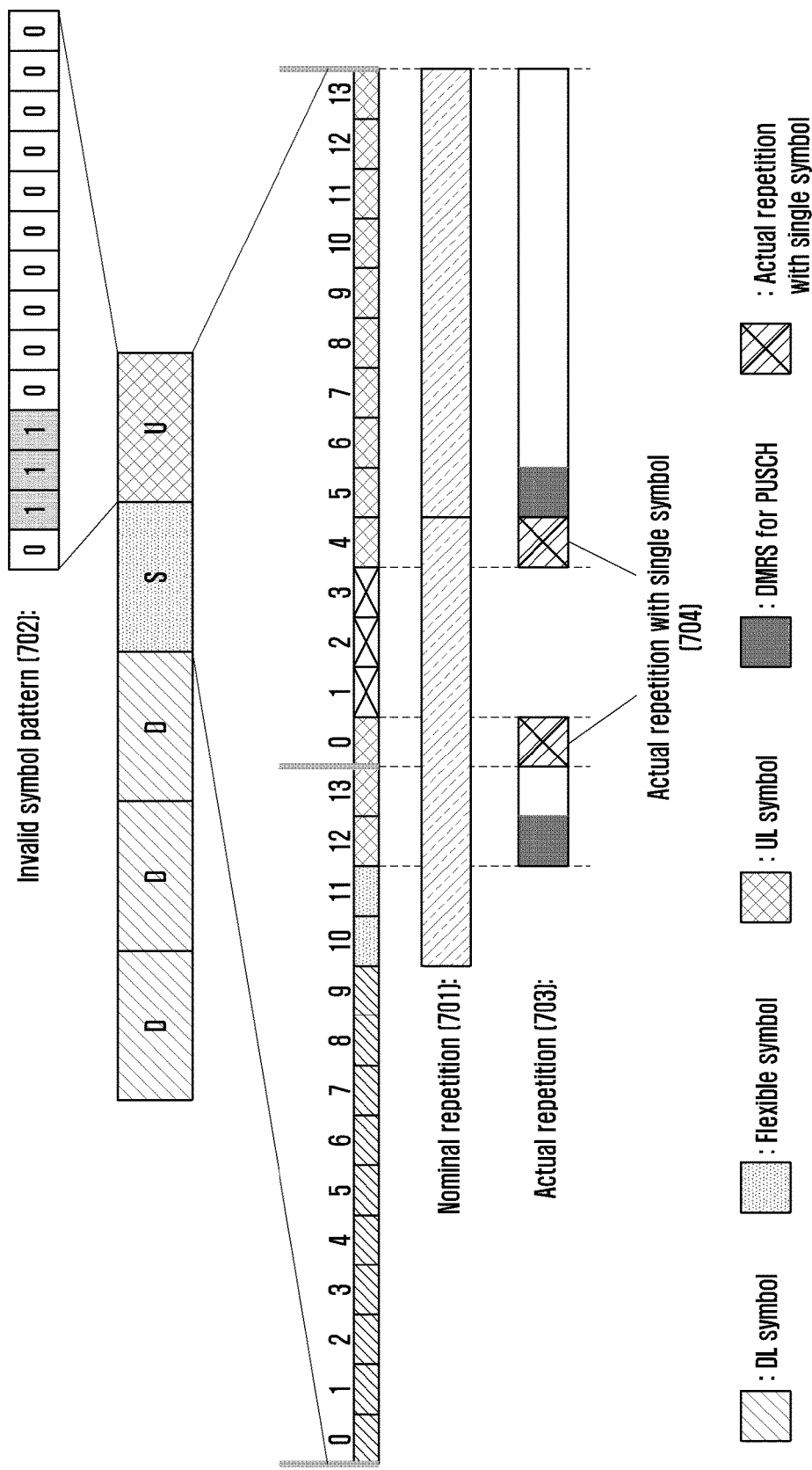
FIG. 7 is a diagram illustrating an example of PUSCH repetition type B in a 5G system according to an embodiment of the disclosure.

FIG. 7 is a diagram illustrating an example of PUSCH repetition type B in a 5G system according to an embodiment of the disclosure.

Referring to FIG. 7, in a case where, for the terminal, the starting symbol S of an uplink data channel is configured to be 10, the length L is configured to be 9, and the number of repetitive transmissions is configured to be 2, nominal repetitions may occur in two consecutive slots (as indicated by reference numeral 701). For invalid symbol determination, the terminal may determine, as an invalid symbol, a symbol configured as a downlink symbol in each nominal repetition, and may determine, as invalid symbols, symbols configured to be 1 in an invalid symbol pattern 702. In a case where valid symbols other than an invalid symbol in each nominal repetition are configured by one or more consecutive symbols in one slot, the terminal may configure an actual repetition configured by the one or more consecutive symbols in the one slot (as indicated by reference numeral 703). The terminal may omit actual repetitions 704 configured by the one symbol. The disclosure proposes a method of using, as PUSCH repetitive transmission and a DMRS, the omitted actual repetitions 704 configured by one symbol when joint channel estimation is configured. According to the method proposed in the disclosure, channel coverage can be improved through channel energy gain and precise channel estimation.

Method 1

In method 1, a method of configuring and transmitting a PUSCH repetitive transmission in an actual repetition configured by one symbol when PUSCH repetition type B and a joint channel estimation are configured for the terminal is proposed.

Figure 8:
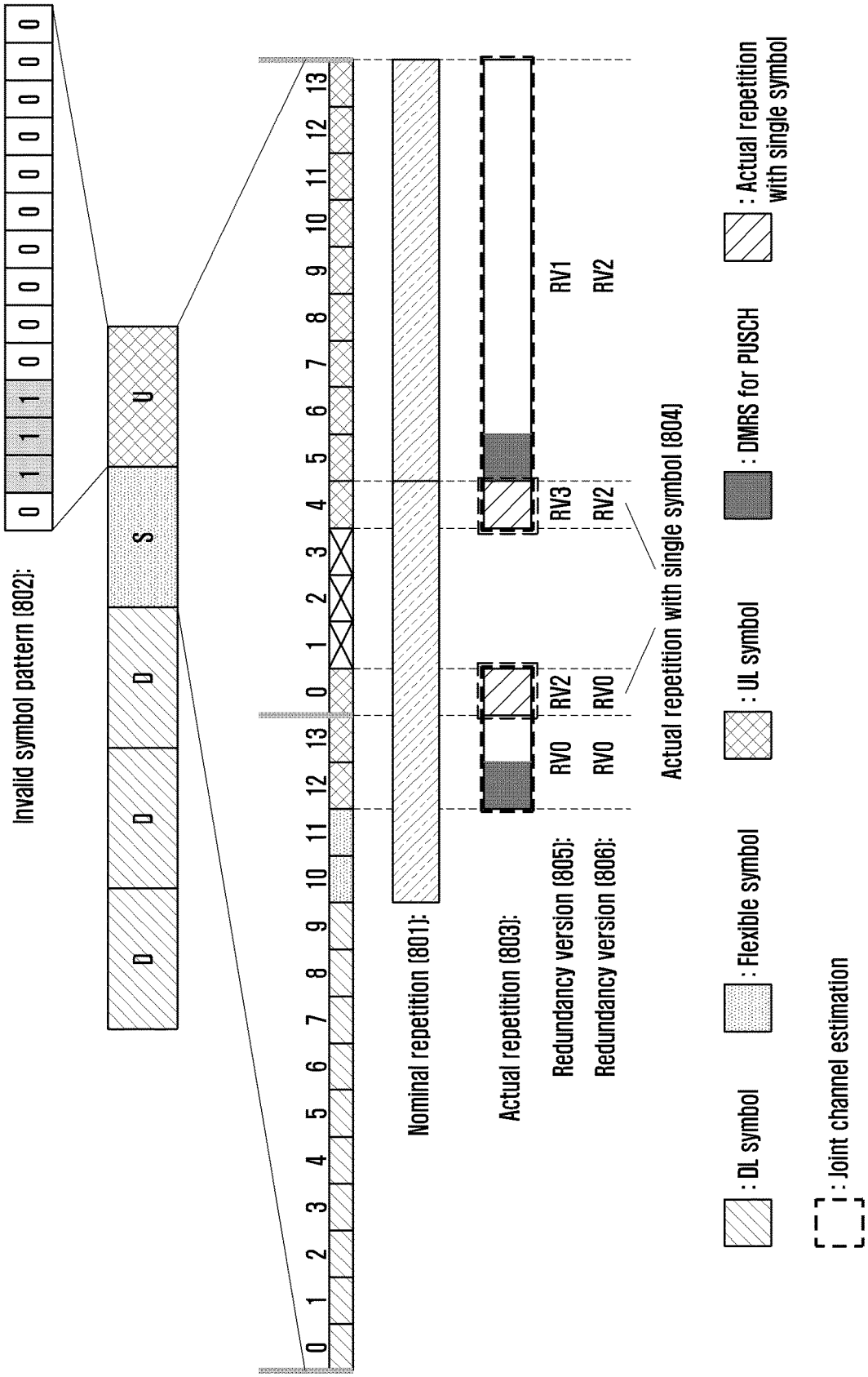
FIG. 8 is a diagram illustrating a method for allocating a resource to an actual repetition configured by one symbol at the time of configuration of a joint channel estimation and PUSCH repetition type B according to an embodiment of the disclosure.

FIG. 8 is a diagram illustrating a method for allocating a resource to an actual repetition configured by one symbol at the time of configuration of a joint channel estimation and PUSCH repetition type B according to an embodiment of the disclosure.

Referring to FIG. 8, in a case where, for the terminal, the starting symbol S of an uplink data channel is configured to be 10, the length L is configured to be 9, and the number of repetitive transmissions is configured to be 2, nominal repetitions may occur in two consecutive slots (as indicated by reference numeral 801). For invalid symbol determination, the terminal may determine, as an invalid symbol, a symbol configured as a downlink symbol in each nominal repetition, and may determine, as invalid symbols, symbols configured to be 1 in an invalid symbol pattern 802. Valid symbols rather than an invalid symbol in each nominal repetition may configure an actual repetition in one slot (as indicated by reference numeral 803). When a joint channel estimation is performed for the actual repetition, transmission may be performed through resource allocation to actual repetitions 804 without omitting an actual repetition having one symbol. A redundancy version may be mapped to actual repetitions configured by one symbol by considering same as the n-th actual repetition (as indicated by reference numeral 805). As another method, an actual repetition configured by one symbol may be mapped according to a redundancy version of the closest actual repetition in which joint channel estimation is performed (as indicated by reference numeral 806). Through the method of the disclosure, if an actual repetition configured by one symbol is used for a PUSCH repetitive transmission, channel energy gain is obtained and thus channel coverage can be enhanced.

Method 2

In method 2, a method of configuring and transmitting DMRS mapping in an actual repetition configured by one symbol when PUSCH repetition type B and a joint channel estimation are configured for the terminal is proposed.

Figure 9:
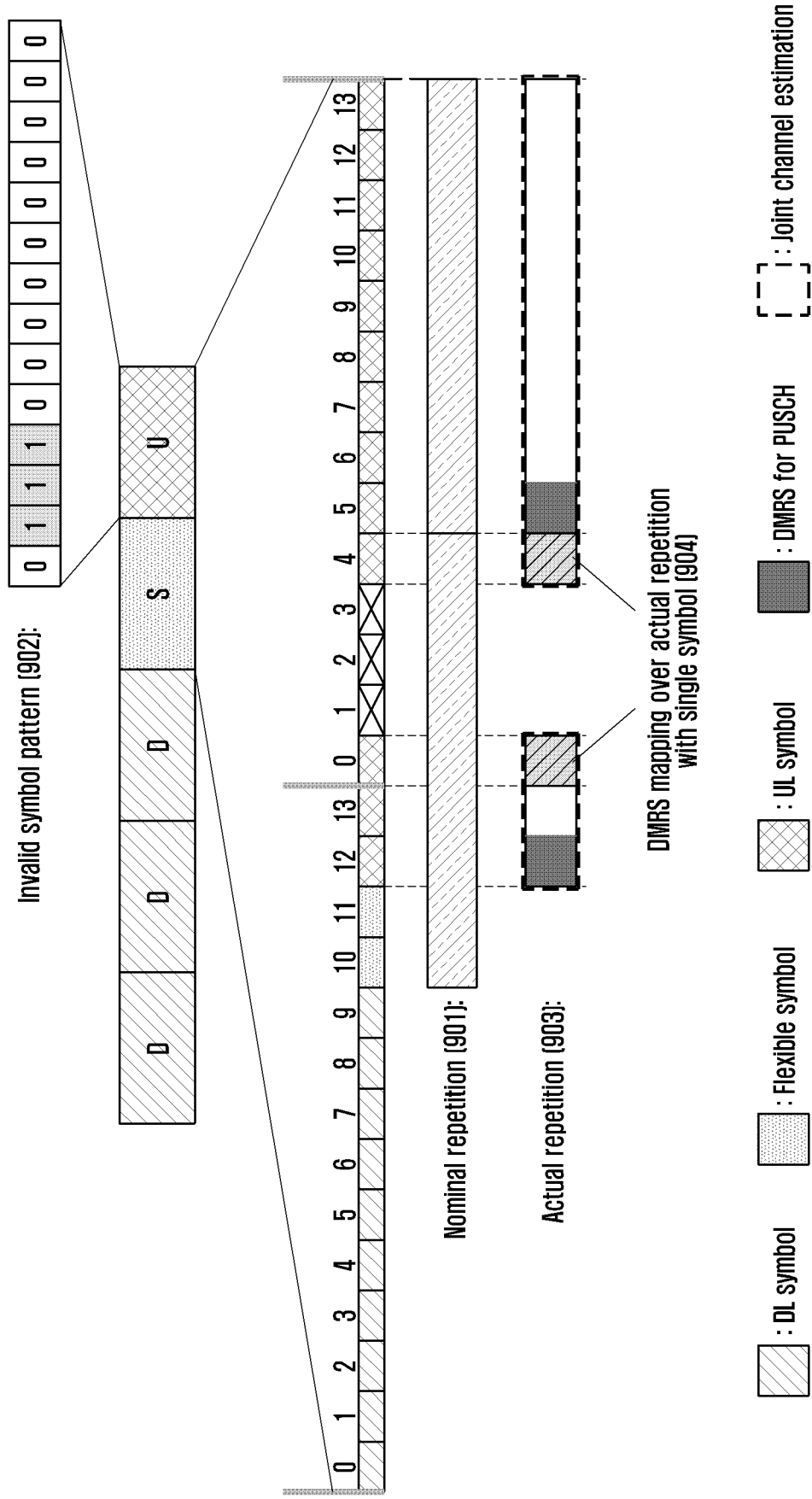
FIG. 9 is a diagram illustrating a method for mapping a DMRS to an actual repetition configured by one symbol at the time of configuration of PUSCH repetition type B and a joint channel estimation according to an embodiment of the disclosure.

FIG. 9 is a diagram illustrating a method for mapping a DMRS to an actual repetition configured by one symbol at the time of configuration of PUSCH repetition type B and a joint channel estimation according to an embodiment of the disclosure.

Referring to FIG. 9, in a case where, for the terminal, the starting symbol S of an uplink data channel is configured to be 10, the length L is configured to be 9, and the number of repetitive transmissions is configured to be 2, nominal repetitions may occur in two consecutive slots (as indicated by reference numeral 901). For invalid symbol determination, the terminal may determine, as an invalid symbol, a symbol configured as a downlink symbol in each nominal repetition, and may determine, as invalid symbols, symbols configured to be 1 in an invalid symbol pattern 902. Valid symbols rather than an invalid symbol in each nominal repetition may configure an actual repetition in one slot (as indicated by reference numeral 903). When a joint channel estimation is performed for the actual repetition, an actual repetition having one symbol may not be omitted, and a DMRS may be mapped to and transmitted on the actual repetition (as indicated by reference numeral 904). Through the method of the disclosure, if an actual repetition configured by one symbol is transmitted as a DMRS, a more precise channel is estimated and thus channel coverage can be enhanced.

Method 3

In method 3, a method of configuring and transmitting a PUSCH repetitive transmission and DMRS mapping in an actual repetition configured by one symbol when PUSCH repetition type B and a joint channel estimation are configured for the terminal is proposed.

Figure 10:
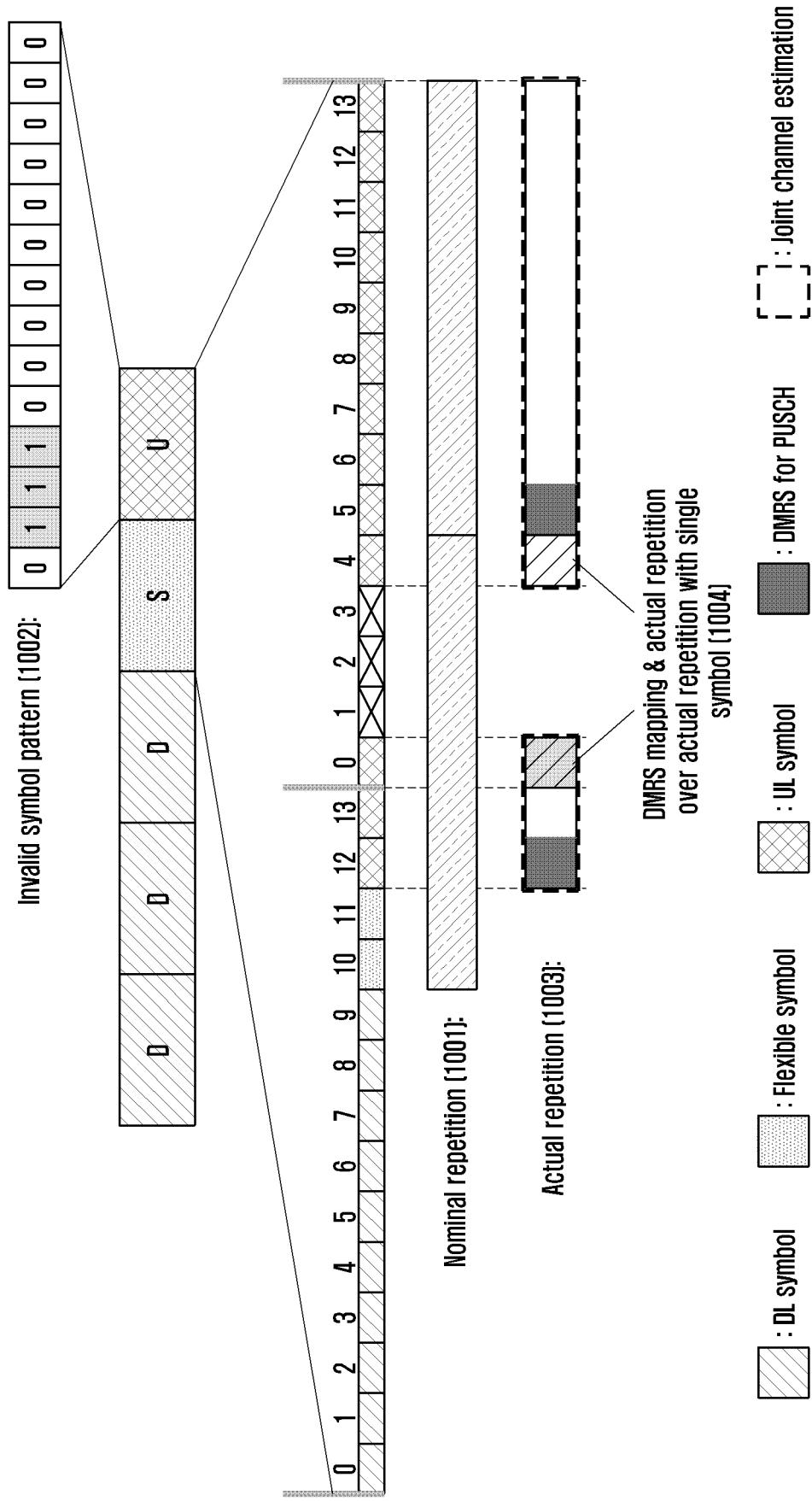
FIG. 10 is a diagram illustrating a method for PUSCH repetitive transmission and DMRS mapping in an actual repetition configured by one symbol at the time of configuration of a joint channel estimation and PUSCH repetition type B according to an embodiment of the disclosure.

FIG. 10 is a diagram illustrating a method for PUSCH repetitive transmission and DMRS mapping in an actual repetition configured by one symbol at the time of configuration of a joint channel estimation and PUSCH repetition type B according to an embodiment of the disclosure.

Referring to FIG. 10, in a case where, for the terminal, the starting symbol S of an uplink data channel is configured to be 10, the length L is configured to be 9, and the number of repetitive transmissions is configured to be 2, nominal repetitions may occur in two consecutive slots (as indicated by reference numeral 1001). For invalid symbol determination, the terminal may determine, as an invalid symbol, a symbol configured as a downlink symbol in each nominal repetition, and may determine, as invalid symbols, symbols configured to be 1 in an invalid symbol pattern 1002. Valid symbols rather than an invalid symbol in each nominal repetition may configure an actual repetition in one slot (as indicated by reference numeral 1003). When a joint channel estimation is performed for the actual repetition, actual repetitions each having one symbol may not be omitted, and a PUSCH repetitive transmission and a DMRS may be mapped to and transmitted on the actual repetitions (as indicated by reference numeral 1004). Through the method of the disclosure, if actual repetitions each configured by one symbol are transmitted as a PUSCH repetitive transmission and a DMRS, channel coverage can be enhanced through channel energy gain and estimation of a more precise channel.

Second Embodiment

The second embodiment of the disclosure provides a method for controlling joint channel estimation for PUSCH repetitive transmission.

Figure 11:
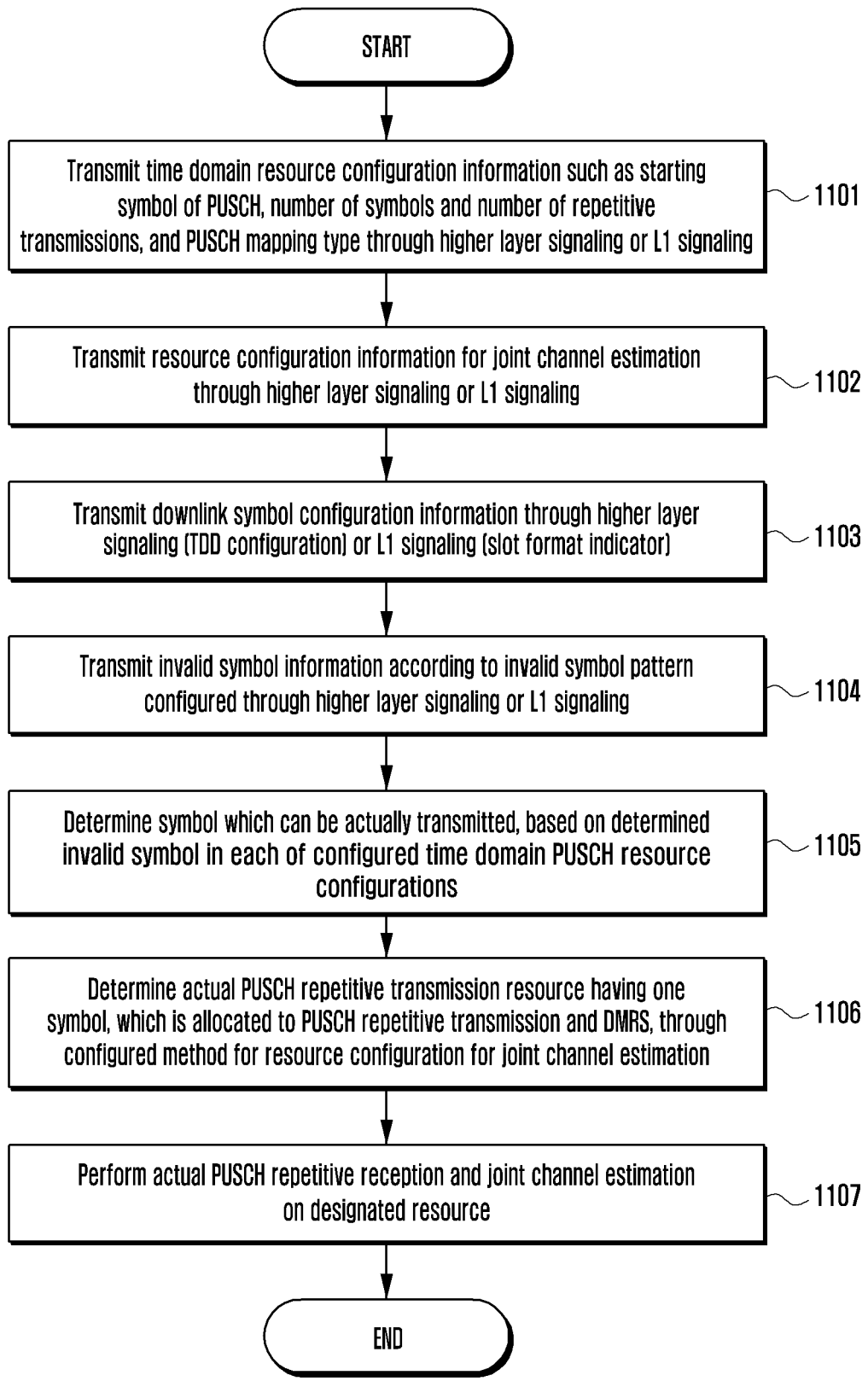
FIG. 11 is a flowchart illustrating an operation of a base station which configures DMRS mapping and resource allocation of a PUSCH repetitive transmission for joint channel estimation according to an embodiment of the disclosure.

FIG. 11 is a flowchart illustrating an operation of a base station which configures DMRS mapping and resource allocation of a PUSCH repetitive transmission for joint channel estimation according to an embodiment of the disclosure. This is for convenience of explanation, and is not required to necessarily include all the operations described below according to a configuration and/or definition in a system, and some operations may be omitted.

Referring to FIG. 11, a base station may transmit, to a terminal and through higher layer signaling or L1 signaling, time domain resource configuration information including at least one of the starting symbol of a PUSCH, the number (length) of symbols and the number of repetitive transmissions, and a PUSCH mapping type at operation 1101. In addition, the base station may transmit, to the terminal and through higher layer signaling or L1 signaling, resource configuration information for joint channel estimation at operation 1102. The base station may transmit downlink symbol configuration information to the terminal through higher layer signaling (e.g., a TDD configuration) or L1 signaling (e.g., a slot format indicator) at operation 1103, and may transmit invalid symbol information to the terminal according to an invalid symbol pattern configured through higher layer signaling or L1 signaling at operation 1104. The base station may determine a symbol which can be actually transmitted, based on the determined invalid symbol in each of the configured time domain PUSCH resource configurations at operation 1105, and determine an actual PUSCH repetitive transmission resource having one symbol, which is allocated to a PUSCH repetitive transmission and a DMRS, through the configured method for resource configuration for joint channel estimation at operation 1106. Thereafter, from the terminal and on a designated resource, the base station may perform an actual PUSCH repetitive reception and a joint channel estimation at operation 1107.

Figure 12:
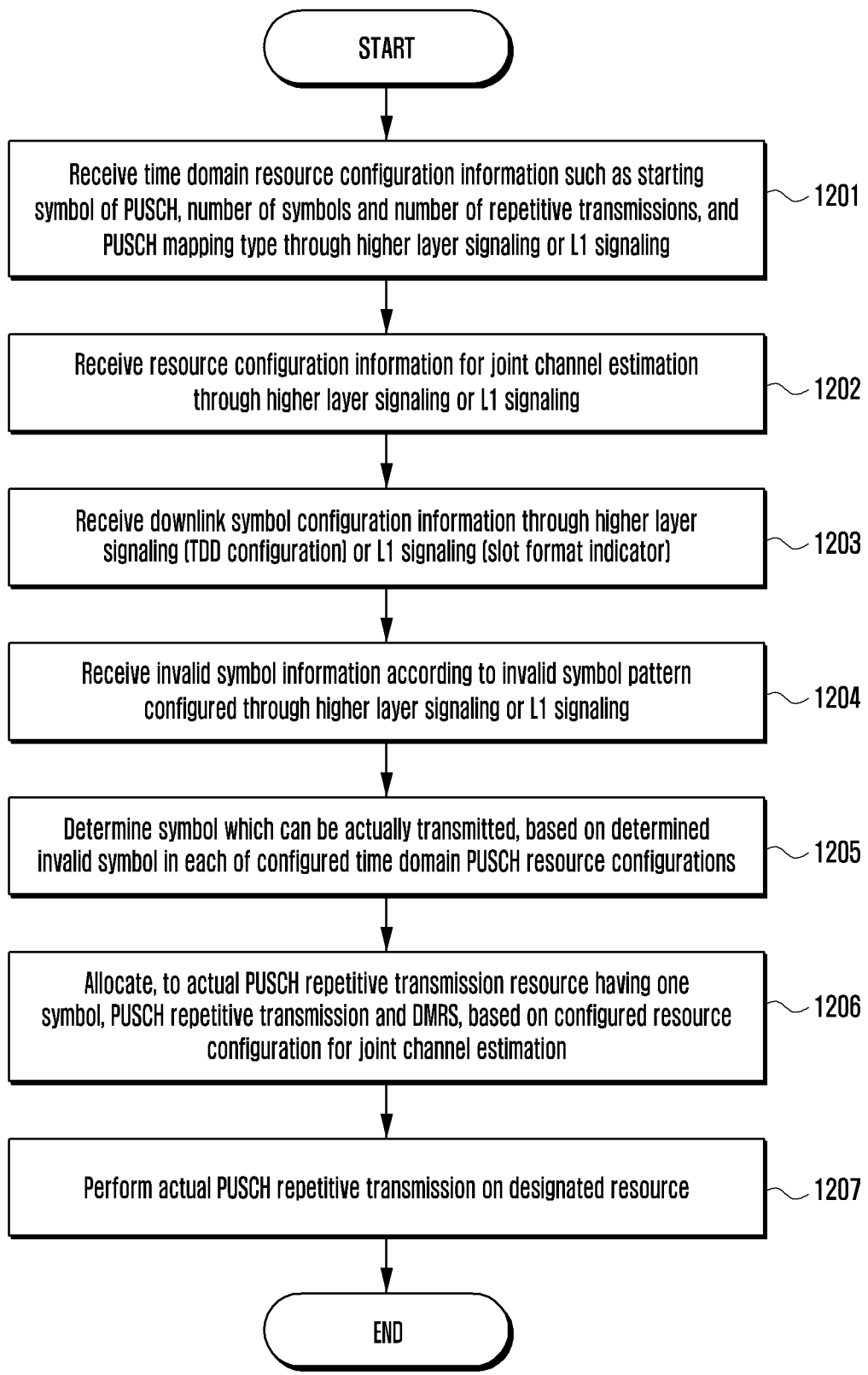
FIG. 12 is a flowchart illustrating an operation of a terminal which performs DMRS mapping and resource allocation of a PUSCH repetitive transmission for joint channel estimation according to an embodiment of the disclosure.

FIG. 12 is a flowchart illustrating an operation of a terminal which performs DMRS mapping and resource allocation of a PUSCH repetitive transmission for joint channel estimation according to an embodiment of the disclosure. This is for convenience of explanation, and is not required to necessarily include all the operations described below according to a configuration and/or definition in a system, and some operations may be omitted.

Referring to FIG. 12, a terminal may receive, from a base station and through higher layer signaling or L1 signaling, time domain resource configuration information including at least one of the starting symbol of a PUSCH, the number (length) of symbols and the number of repetitive transmissions, and a PUSCH mapping type at operation 1201. The terminal may receive, from the base station and through higher layer signaling or L1 signaling, resource configuration information for joint channel estimation at operation 1202. The terminal may receive downlink symbol configuration information from the base station through higher layer signaling (e.g., a TDD configuration) or L1 signaling (e.g., a slot format indicator) at operation 1203, and may receive invalid symbol information from the base station according to an invalid symbol pattern configured through higher layer signaling or L1 signaling at operation 1204. The terminal may determine a symbol which can be actually transmitted, based on the determined invalid symbol in each of the configured time domain PUSCH resource configurations at operation 1205, and allocate a PUSCH repetitive transmission and a DMRS to an actual PUSCH repetitive transmission resource having one symbol, based on the configured resource configuration for joint channel estimation at operation 1206. Thereafter, the terminal may perform an actual PUSCH repetitive transmission to the base station on a designated resource at operation 1207.

The base station may configure, for the terminal, a method for performing resource allocation and DMRS mapping according to a method for PUSCH repetitive transmission and joint channel estimation, proposed in the disclosure. In the method, in order to allocate a PUSCH repetitive transmission and a DMRS to an actual repetition configured by one symbol, the allocation may be configured through higher layer signaling and L1 signaling, and may be indicated according to a bitmap form and occasions and a count number of nominal repetitions/actual repetitions as an indication method. In the one example of the disclosure, a method for PUSCH repetitive transmission resource allocation configured through higher layer signaling and L1 signaling is merely for an example, and does not limit the scope of the disclosure.

Third Embodiment

The third embodiment of the disclosure provides a configuration method for DMRS mapping at the time of configuration of a PUSCH repetitive transmission and a joint channel estimation.

Figure 13:
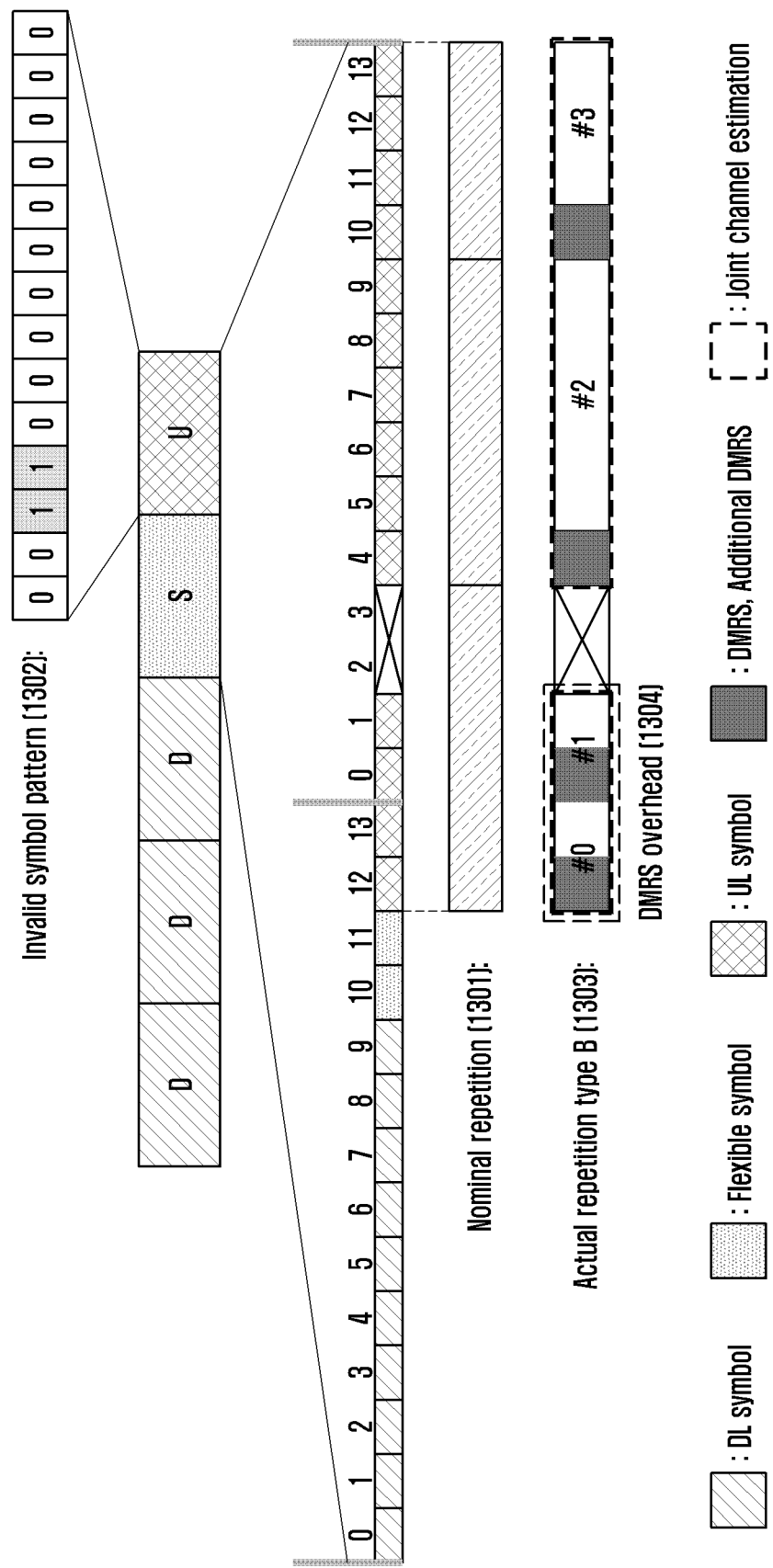
FIG. 13 is a diagram illustrating a method for DMRS mapping and a joint channel estimation at the time of configuration of the joint channel estimation and PUSCH repetition type B according to an embodiment of the disclosure.

FIG. 13 is a diagram illustrating an example of DMRS mapping and joint channel estimation at the time of configuration of a joint channel estimation and PUSCH repetition type B according to an embodiment of the disclosure.

Referring to FIG. 13, in a case where, for the terminal, the starting symbol S of an uplink data channel is configured to be 12, the length L is configured to be 6, and the number of repetitive transmissions is configured to be 3, nominal repetitions may occur in two consecutive slots (as indicated by reference numeral 1301). For invalid symbol determination, the terminal may determine, as an invalid symbol, a symbol configured as a downlink symbol in each nominal repetition, and may determine, as invalid symbols, symbols configured to be 1 in an invalid symbol pattern 1302. Valid symbols rather than an invalid symbol in each nominal repetition may configure an actual repetition in one slot (as indicated by reference numeral 1303). In a case of the configured actual repetitions #0 and #1, a DMRS may be mapped to the first symbol of the actual repetition, based on the symbol length of the actual repetition. When a joint channel estimation is configured for actual repetitions #0 and #1, DMRS overhead 1304 may occur in a PUSCH repetitive transmission in which the joint channel estimation is performed.

Figure 14:
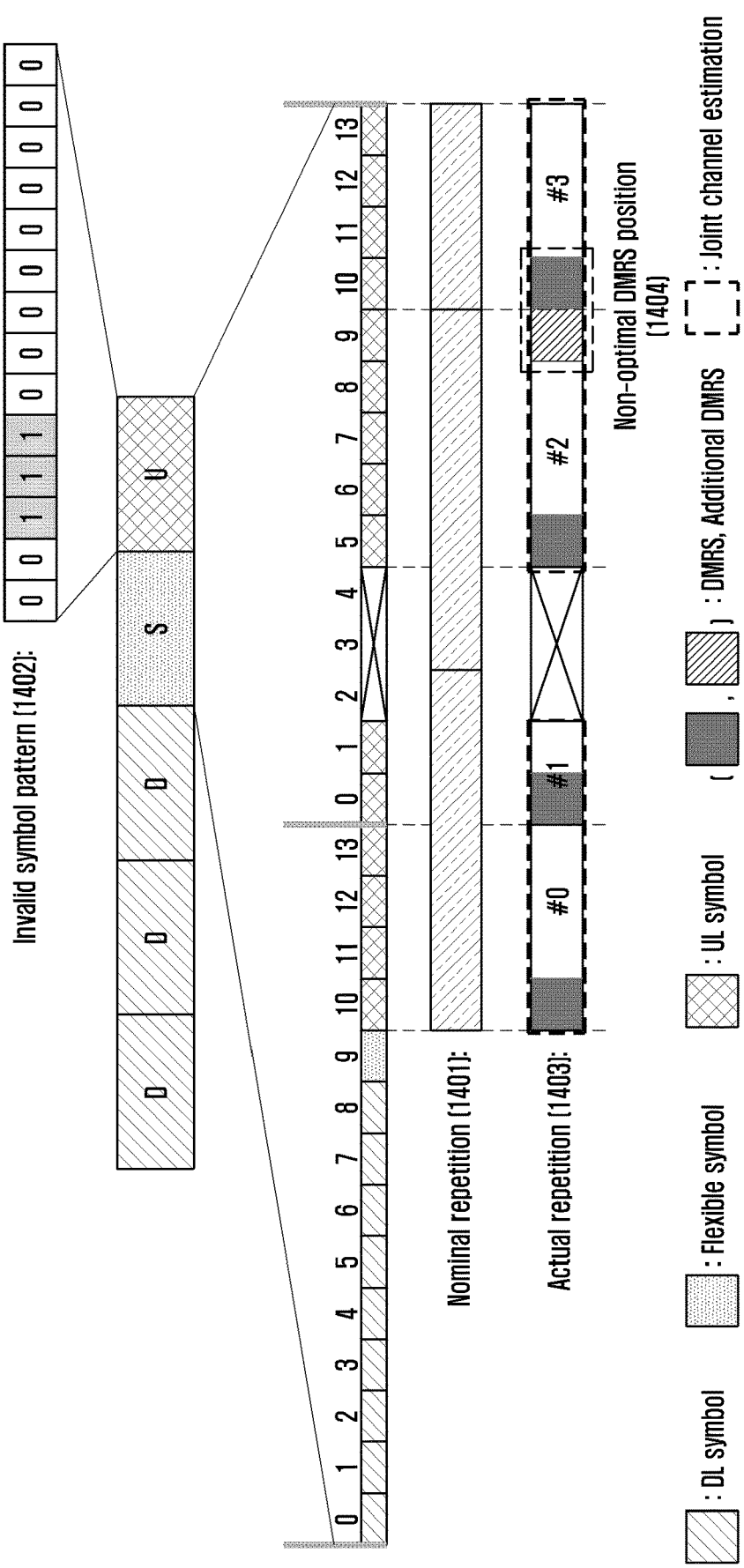
FIG. 14 is a diagram illustrating a method for DMRS mapping and a joint channel estimation at the time of configuration of the joint channel estimation and PUSCH repetition type B according to an embodiment of the disclosure.

FIG. 14 is a diagram illustrating an example of DMRS mapping and joint channel estimation at the time of configuration of joint channel estimation and PUSCH repetition type B according to an embodiment of the disclosure.

Referring to FIG. 14, in a case where, for the terminal, the starting symbol S of an uplink data channel is configured to be 10, the length L is configured to be 7, and the number of repetitive transmissions is configured to be 3, nominal repetitions may occur in two consecutive slots (as indicated by reference numeral 1401). For invalid symbol determination, the terminal may determine, as an invalid symbol, a symbol configured as a downlink symbol in each nominal repetition, and may determine, as invalid symbols, symbols configured to be 1 in an invalid symbol pattern 1402. Valid symbols rather than an invalid symbol in each nominal repetition may configure an actual repetition in one slot (as indicated by reference numeral 1403). When dmrs-AdditionalPosition is configured to be pos1 through higher layer signaling, in a case of the configured actual repetition #2, a DMRS may be configured in the first symbol of the actual repetition, based on the symbol length of the actual repetition, and an additional DMRS may be mapped to the fourth symbol of the actual repetition, and in a case of the configured actual repetition #3, a DMRS may be mapped to the first symbol of the actual repetition. When a joint channel estimation is configured for actual repetitions #2 and #3, consecutive DMRS mapping 1404 may occur in a PUSCH repetitive transmission in which the joint channel estimation is performed.

Hereinafter, a DMRS mapping method proposed in the disclosure at the time of a PUSCH repetitive transmission and a joint channel estimation configuration will be described. A DMRS overhead and a consecutive DMRS mapping problem can be resolved through the DMRS mapping method proposed in the disclosure, so as to improve the performance of channel estimation and a channel.

Method 1

When a PUSCH repetitive transmission and a joint channel estimation are configured by the base station for the terminal through higher layer signaling and L1 signaling, DMRS mapping may be performed by fixing dmrs-AdditionalPosition to pos0 for DMRS mapping, or applying Table 9 below. In this case, mapping of one or two DMRSs may be accomplished to each actual repetition. In the disclosure, the base station may control the number of DMRSs of an actual repetition so as to reduce a DMRS overhead. Therefore, the DMRS overhead can be reduced without an additional complex algorithm in a situation where a channel state is fine.

TABLE 9

| | DM-RS positions | | | | | | | |
|---|---|---|---|---|---|---|---|---|
| $l_d$ in | PUSCH mapping type A dmrs-AdditionalPosition | | | | PUSCH mapping type B dmrs-AdditionalPosition | | | |
| symbols | pos0 | pos1 | pos2 | pos3 | pos0 | pos1 | pos2 | pos3 |
| <4 | — | — | — | — | $l_0$ | $l_0$ | — | — |
| 4 | $l_0$ | $l_0$ | — | — | $l_0$ | $l_0$ | — | — |
| 5 | $l_0$ | $l_0$ | — | — | $l_0$ | $l_0$, 4 | — | — |
| 6 | $l_0$ | $l_0$ | — | — | $l_0$ | $l_0$, 4 | — | — |
| 7 | $l_0$ | $l_0$ | — | — | $l_0$ | $l_0$, 4 | — | — |
| 8 | $l_0$ | $l_0$, 7 | — | — | $l_0$ | $l_0$, 6 | — | — |
| 9 | $l_0$ | $l_0$, 7 | — | — | $l_0$ | $l_0$, 6 | — | — |
| 10 | $l_0$ | $l_0$, 9 | — | — | $l_0$ | $l_0$, 8 | — | — |
| 11 | $l_0$ | $l_0$, 9 | — | — | $l_0$ | $l_0$, 8 | — | — |
| 12 | $l_0$ | $l_0$, 9 | — | — | $l_0$ | $l_0$, 10 | — | — |
| 13 | $l_0$ | $l_0$, 11 | — | — | $l_0$ | $l_0$, 10 | — | — |
| 14 | $l_0$ | $l_0$, 11 | — | — | $l_0$ | $l_0$, 10 | — | — |

Method 2

When a PUSCH repetitive transmission and a joint channel estimation are configured by the base station for the terminal through higher layer signaling and L1 signaling, PUSCH repetitive transmissions to be subject to a joint channel estimation may be grouped based on a random variable for the configured joint channel estimation. Thereafter, the terminal may perform DMRS mapping, based on a PUSCH repetitive transmission group subjected to a joint channel estimation, so as to repeatedly transmit a PUSCH.

Figure 15:
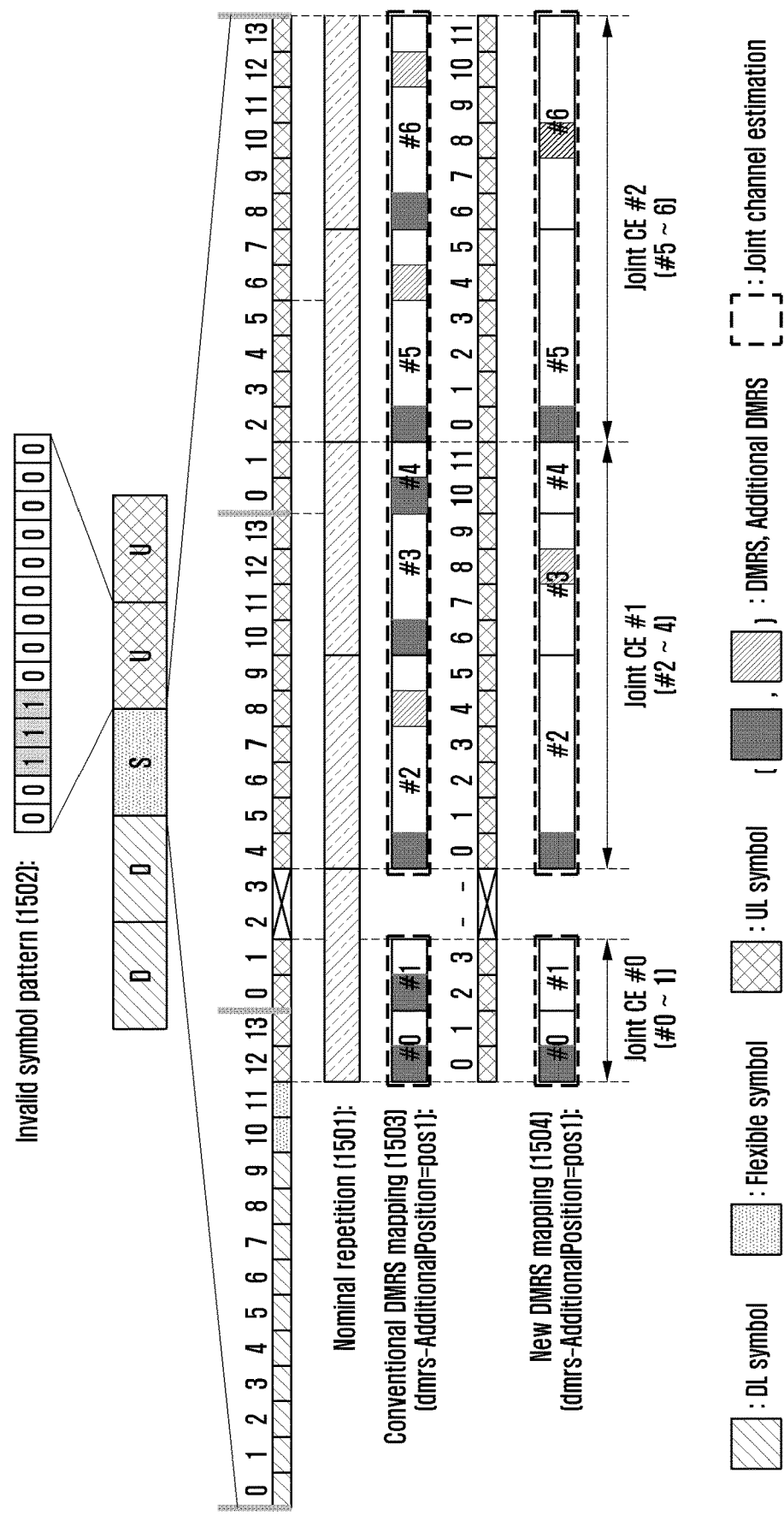
FIG. 15 is a diagram illustrating a method for DMRS mapping when a joint channel estimation and PUSCH repetition type B are configured for a terminal by a base station according to an embodiment of the disclosure.

FIG. 15 is a diagram illustrating a method for DMRS mapping when a joint channel estimation and PUSCH repetition type B are configured for a terminal by a base station according to an embodiment of the disclosure.

Referring to FIG. 15, in a case where, for the terminal, the starting symbol S of an uplink data channel is configured to be 12, the length L is configured to be 6, and the number of repetitive transmissions is configured to be 5, nominal repetitions may occur in three consecutive slots (as indicated by reference numeral 1501). For invalid symbol determination, the terminal may determine, as an invalid symbol, a symbol configured as a downlink symbol in each nominal repetition, and may determine, as invalid symbols, symbols configured to be 1 in an invalid symbol pattern 1502. Valid symbols rather than an invalid symbol in each nominal repetition may configure an actual repetition in one slot. When dmrs-AdditionalPosition is configured to be pos1 for the terminal through higher layer signaling, a DMRS may be mapped based on the symbol length of each actual repetition (as indicated by reference numeral 1503).

When 3 is configured by the base station as a random variable k for the terminal for a joint channel estimation configuration, an actual repetition group for joint channel estimation may be configured such that the number of actual repetitions for which joint channel estimation is possible does not exceed k=3 (as indicated by reference numeral 1504). The configured repetitions #0 and #1 may be configured to be group joint CE #0, actual repetitions #2, #3, and #4 may be configured to be group joint CE #1, actual repetitions #5 and #6 may be configured to be group joint CE #2. The terminal may apply DMRS mapping to the configured joint CEs #0, #1, and #2 for DMRS mapping according to an embodiment. In addition, in a case where the sum of the symbol lengths of PUSCH repetitive transmissions for grouped joint channel estimation is greater than 14, the total number of symbols L may be divided by 14, and DMRS mapping may be repeatedly applied. When a PUSCH repetitive transmission group for joint channel estimation is configured for non-consecutive PUSCH repetitive transmissions, the terminal proceeds DMRS mapping, based on the total number of symbol lengths of consecutive PUSCH repetitive transmissions.

FIG. 16 is a diagram illustrating a method for DMRS mapping of consecutive and non-consecutive PUSCH repetitive transmissions when a joint channel estimation and PUSCH repetition type B are configured for a terminal by a base station according to an embodiment of the disclosure.

Referring to FIG. 16, a method for DMRS mapping when PUSCH repetition type B is configured for the terminal, and two consecutive actual repetitions #0 and #1 are transmitted due to a slot boundary is illustrated. A DMRS may be mapped to the first symbol of an actual repetition by the described DMRS mapping scheme. When a joint channel estimation is configured, the DMRS mapping method proposed in the disclosure may be applied to the two actual repetitions. When a joint channel estimation is configured, DMRS mapping may be performed based on the sum of the numbers of symbols of the two consecutive actual repetitions #0 and #1 (as indicated by reference numeral 1601).

In addition, a method for DMRS mapping when PUSCH repetition type B is configured for the terminal, and two non-consecutive actual repetitions #0 and #1 are transmitted due to a slot boundary and an invalid symbol is illustrated. A DMRS may be mapped to the first symbol of an actual repetition by the described DMRS mapping scheme. When a joint channel estimation is configured, the DMRS mapping method proposed in the disclosure may be applied to the two non-consecutive actual repetitions. When joint channel estimation is configured, DMRS mapping may be performed based on the sum 1602 of the number of symbols of the two non-consecutive actual repetitions #0 and #1. Alternatively, DMRS mapping may be performed based on the sum 1603 of the number of invalid symbols and the number of symbols of the two non-consecutive actual repetitions #0 and #1.

Through the disclosure, PUSCH repetitive transmissions for joint channel estimation are grouped and a DMRS mapping method according to an embodiment of the disclosure is applied, whereby DMRS overhead can be reduced and consecutive DMRS mapping can be improved. A PUSCH repetitive transmission grouping method and a DMRS mapping method configured for joint channel estimation through higher layer signaling and L1 signaling in an example of the disclosure merely correspond to examples, and do not limit the scope of the disclosure. A random variable and a grouping method configured for joint channel estimation may be configured by a bitmap, a symbol/slot length, and the number of nominal repetitions/actual repetitions. In addition, one or a combination of the described methods may be applied.

Fourth Embodiment

The fourth embodiment of the disclosure provides a method for DMRS mapping at the time of configuration of a PUSCH repetitive transmission and a joint channel estimation.

Figure 17:
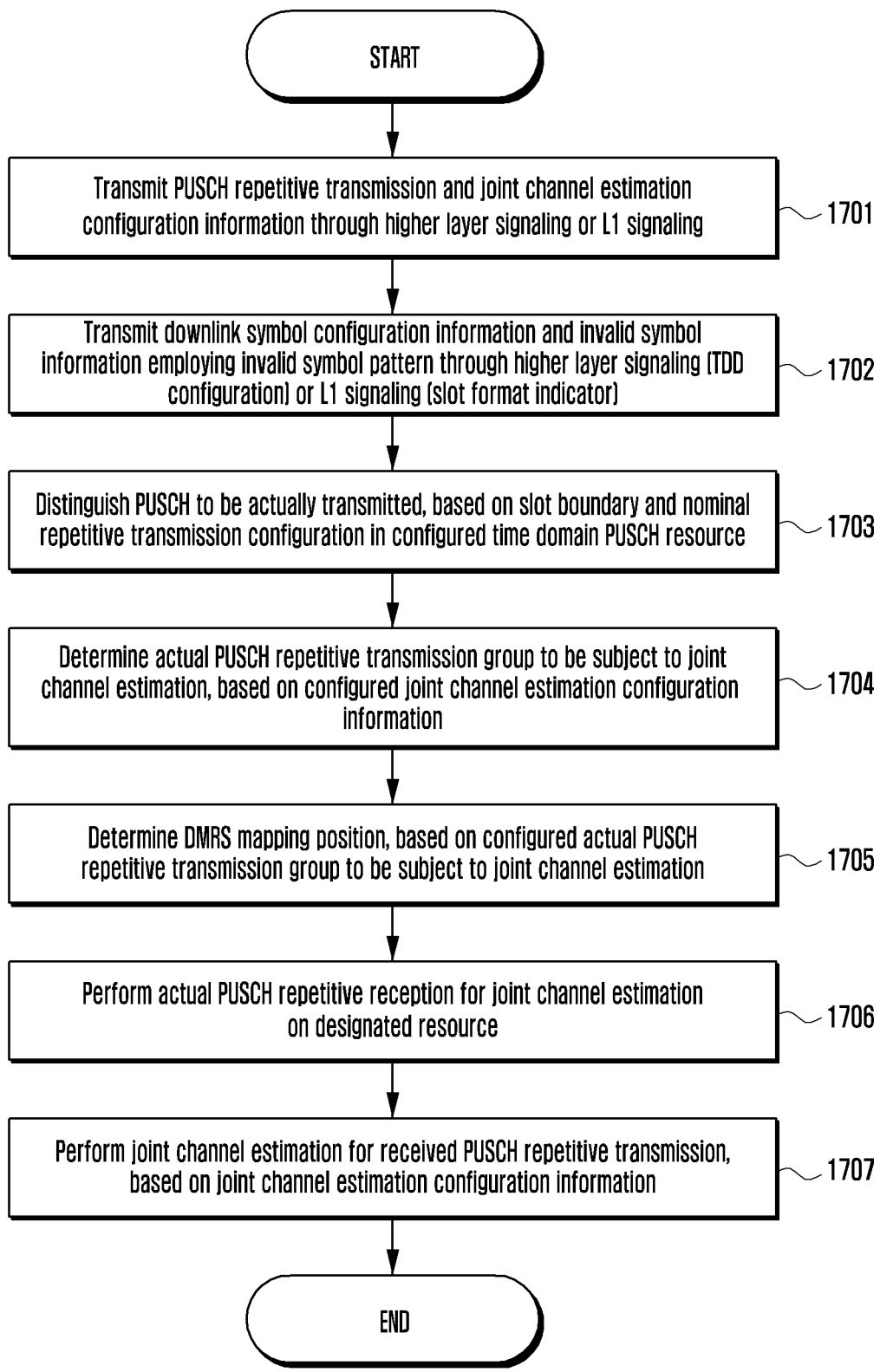
FIG. 17 is a flowchart illustrating an operation of a base station which controls joint channel estimation configuration and DMRS mapping for actual PUSCH repetitive transmission according to an embodiment of the disclosure.

FIG. 17 is a flowchart illustrating an operation of a base station which controls a joint channel estimation configuration and DMRS mapping for actual PUSCH repetitive transmission according to an embodiment of the disclosure. This is for convenience of explanation, and is not required to necessarily include all the operations described below according to a configuration and/or definition in a system, and some operations may be omitted.

Referring to FIG. 17, a base station may transmit, to a terminal and through higher layer signaling or L1 signaling, PUSCH repetitive transmission and joint channel estimation configuration information at operation 1701. Thereafter, the base station may transmit downlink symbol configuration information and invalid symbol information employing an invalid symbol pattern to the terminal through higher layer signaling (e.g., TDD configuration) or L1 signaling (e.g., a slot format indicator) at operation 1702. In addition, the base station may distinguish a PUSCH to be actually transmitted, based on a slot boundary and s nominal repetitive transmission configuration in the configured PUSCH time domain resource at operation 1703, and determine an actual PUSCH repetitive transmission group to be subject to a joint channel estimation, based on the configured joint channel estimation configuration information at operation 1704. The base station may determine a DMRS mapping position, based on the configured actual PUSCH repetitive transmission group to be subject to the joint channel estimation at operation 1705, and may receive an actual PUSCH repetition for joint channel estimation on a designated resource from the terminal at operation 1706. Thereafter, the base station may perform a joint channel estimation for the received actual PUSCH repetitive transmission, based on the received joint channel estimation configuration information at operation 1707.

Figure 18:
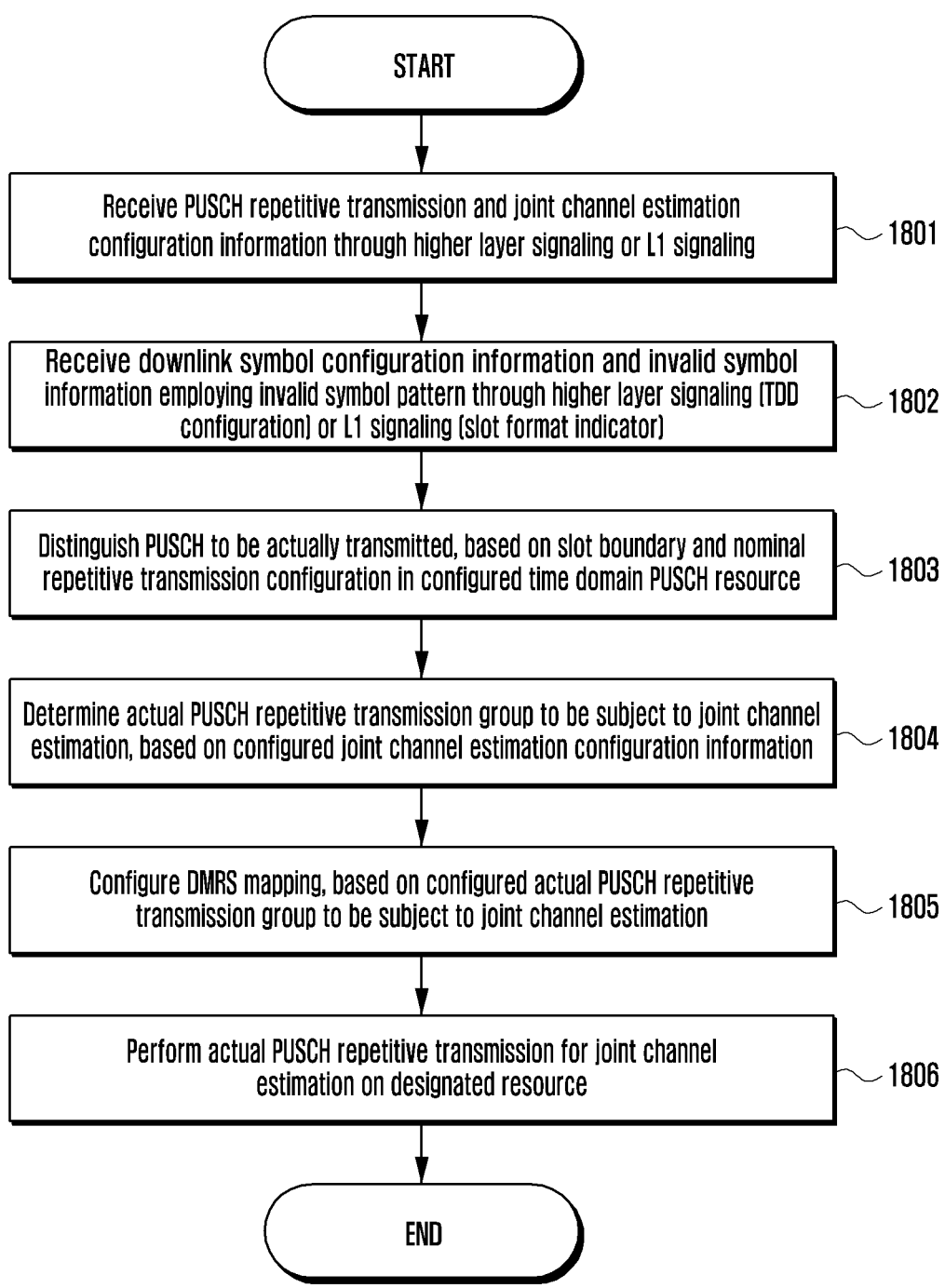
FIG. 18 is a flowchart illustrating an DMRS mapping method of a terminal for which a joint channel estimation for an actual PUSCH repetitive transmission is configured according to an embodiment of the disclosure.

FIG. 18 is a flowchart illustrating an DMRS mapping method of a terminal for which a joint channel estimation for actual PUSCH repetitive transmission is configured according to an embodiment of the disclosure. This is for convenience of explanation, and is not required to necessarily include all the operations described below according to a configuration and/or definition in a system, and some operations may be omitted.

Referring to FIG. 18, a terminal may receive, from a base station and through higher layer signaling or L1 signaling, PUSCH repetitive transmission and joint channel estimation configuration information at operation 1801. Thereafter, the terminal may receive downlink symbol configuration information and invalid symbol information employing an invalid symbol pattern from the base station through higher layer signaling (e.g., TDD configuration) or L1 signaling (e.g., a slot format indicator) at operation 1802. In addition, the terminal may distinguish a PUSCH to be actually transmitted, based on a slot boundary and a nominal repetitive transmission configuration in the configured PUSCH time domain resource at operation 1803, determine an actual PUSCH repetitive transmission group to be subject to a joint channel estimation, based on the configured joint channel estimation configuration information at operation 1804, and perform DMRS mapping, based on the configured actual PUSCH repetitive transmission group to be subject to the joint channel estimation at operation 1805. Thereafter, the terminal may perform an actual PUSCH repetitive transmission for joint channel estimation on a designated resource at operation 1806.

The base station may be determined using one or a combination of the following methods to configure a random variable for DMRS mapping and grouping of PUSCH repetitive transmissions for joint channel estimation as described above.

Method 1

For grouping of PUSCH repetitive transmissions and DMRS mapping for joint channel estimation, the base station may operate through configuring at least one of the number of slots, the number of nominal repetitions, the number of actual repetitions, and the number of available symbols as random control variables. The base station may distinguish, through the configured random variable and as one PUSCH repetitive transmission group, PUSCH repetitive transmissions for which joint channel estimation is performed, and may perform DMRS mapping, based on the PUSCH repetitive transmission group. The PUSCH repetitive transmission group may be applied to the same occasion.

Method 2

For grouping of PUSCH repetitive transmissions and DMRS mapping for joint channel estimation, the base station may control grouping of PUSCH repetitive transmissions for joint channel estimation and DMRS mapping through a bitmap by higher layer signaling and L1 signaling. The terminal may configure the same PUSCH occasion for a PUSCH repetitive transmission group subjected to joint channel estimation, and perform transmission.

The base station may control grouping of PUSCH repetitive transmissions and DMRS mapping for joint channel estimation by using the control method for joint channel estimation. In addition, the base station may control joint channel estimation by using one or a combination of the described methods.

Fifth Embodiment

The fifth embodiment of the disclosure provides a channel estimation method based on artificial intelligence (AI)/machine learning (ML).

A method of transmitting or receiving a signal by using an artificial neural network has been currently researched as a method for resolving a non-linear communication system problem and the overhead of wireless communication signaling when communication between a terminal and a base station in a B5G/6G communication system is performed. Through the method of the disclosure, a method for reducing the overhead of an uplink reference signal of the terminal is proposed. Hereinafter, a method and an apparatus proposed in embodiments of the disclosure describe the embodiments of the disclosure as an example for reducing DMRS overhead at the time of PUSCH transmission over multiple slots, but are not applied limitedly to each embodiment. It may also be possible to use a combination of all or some of one or more embodiments proposed in the disclosure, in a resource configuring method corresponding to a different channel. In addition, in order to reduce the overhead of a different reference signal, the method proposed in the disclosure may be applied.

Figure 19:
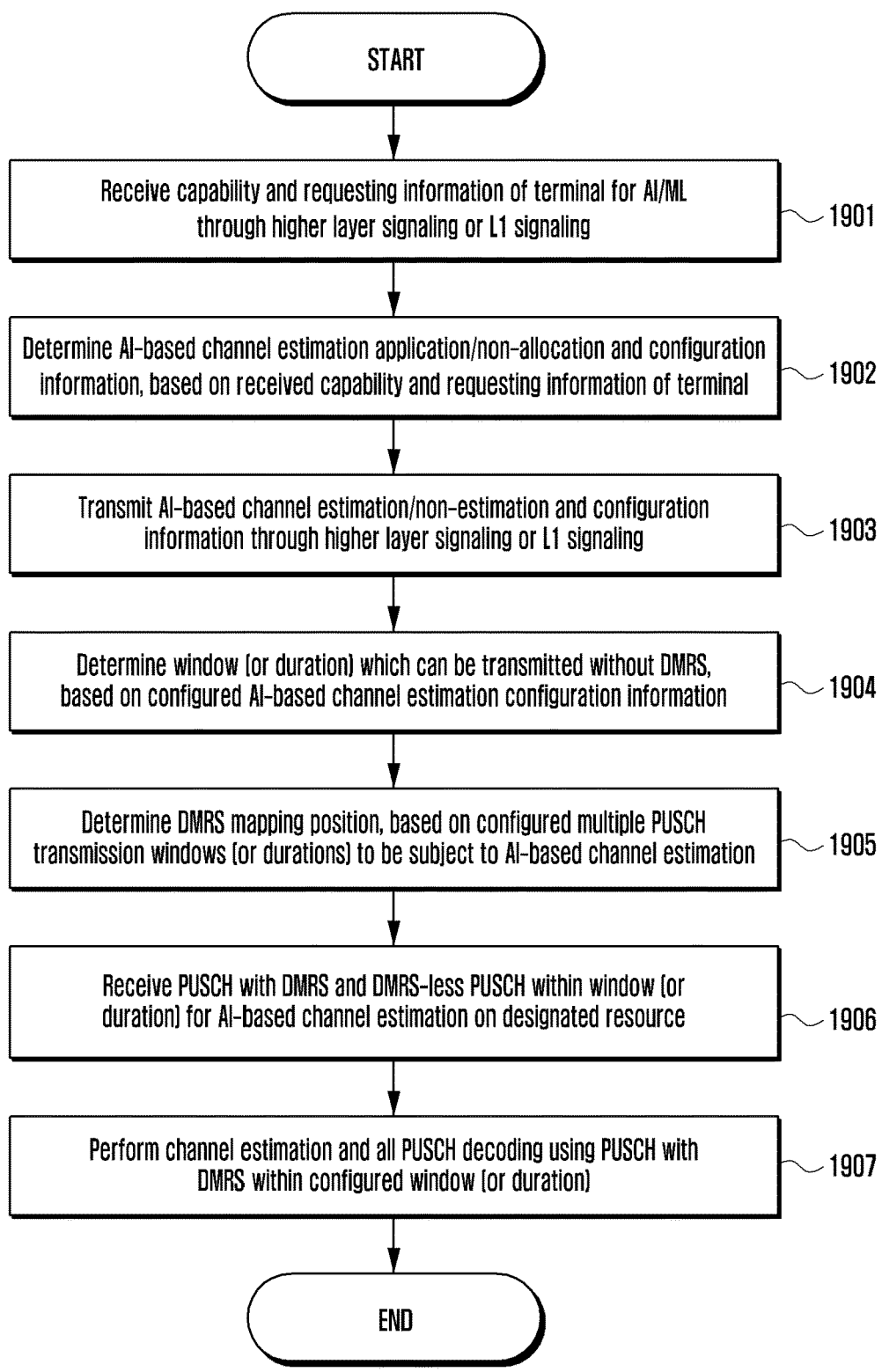
FIG. 19 is a flowchart illustrating an operation of a base station which controls an AI-based joint channel estimation and DMRS mapping according to an embodiment of the disclosure.

FIG. 19 is a flowchart illustrating an operation of a base station which controls AI-based joint channel estimation and DMRS mapping according to an embodiment of the disclosure.

Referring to FIG. 19, a base station may receive, from a terminal and through higher layer signaling or L1 signaling, capability and/or requesting information of a terminal for supporting AI/ML at operation 1901. The base station may determine AI-based channel estimation application/non-application and configuration information, based on the received information of the terminal at operation 1902. The configuration information may include information relating to a time range (duration) in which an adjacent PUSCH channel can be estimated through a DMRS transmitted in one PUSCH via an AI model. For example, when the duration is configured to be six slots or six repetitions, the terminal may transmit a DMRS through one random PUSCH when type A PUSCH repetitions #0-#5 are transmitted in the duration, and transmit the remaining five DMRS-less PUSCHs, so as to reduce DMRS overhead in the duration. The base station may decode a DMRS-less PUSCH by using a DMRS received in one PUSCH transmission. Additionally, AI-based channel estimation configuration information may include information indicating whether to apply an AI-based channel estimation for non-consecutive PUSCH transmissions. For example, when a feature indicator or field (e.g., "Enabling-NonconsecutiveAI-CE") is enabled through higher layer signaling and L1 signaling, an AI-based channel estimation can be performed for a PUSCH transmission transmitted through non-consecutive physical slots in the duration configured for the AI-based channel estimation. Thereafter, the base station may transmit, to the terminal and through higher layer signaling or L1 signaling, the determined AI-based channel estimation configuration information at operation 1903. Thereafter, the base station may determine a window (or duration) for application of AI-based channel estimation, based on the configured configuration information at operation 1904. A window (or duration) may be configured based on an available slot determined through time domain resource allocation (TDRA) configured for a PUSCH transmission and semi-static RRC configurations (e.g., tdd-UL-DL-ConfigurationCommon, tdd-UL-DL-Configuration-Dedicated, and ssb-PositionsInBurst) in consideration of Rel-17 PUSCH transmission. In addition, a window may be configured in consideration of consecutive physical slots in a case of Rel-15/16 PUSCH transmission. Thereafter, the base station may determine a position to which a DMRS is mapped in the determined window at operation 1905. The base station may apply a method of the third embodiment or the fourth embodiment as a method for mapping a DMRS in the determined window. In addition, the base station may selectively configure a DMRS-including PUSCH and a DMRS-less PUSCH. The same may be variously configured through a predefined scheme, a bitmap scheme, and configuration of the number of a PUSCH to include a DMRS in the window as configuration methods. Thereafter, the base station may receive, from the terminal, a DMRS-including PUSCH and a DMRS-less PUSCH, based on the determined information at operation 1906. The base station may estimate a channel of the DMRS-less PUSCH through an AI model by using the received DMRS, and decode all the PUSCHs at operation 1907.

Figure 20:
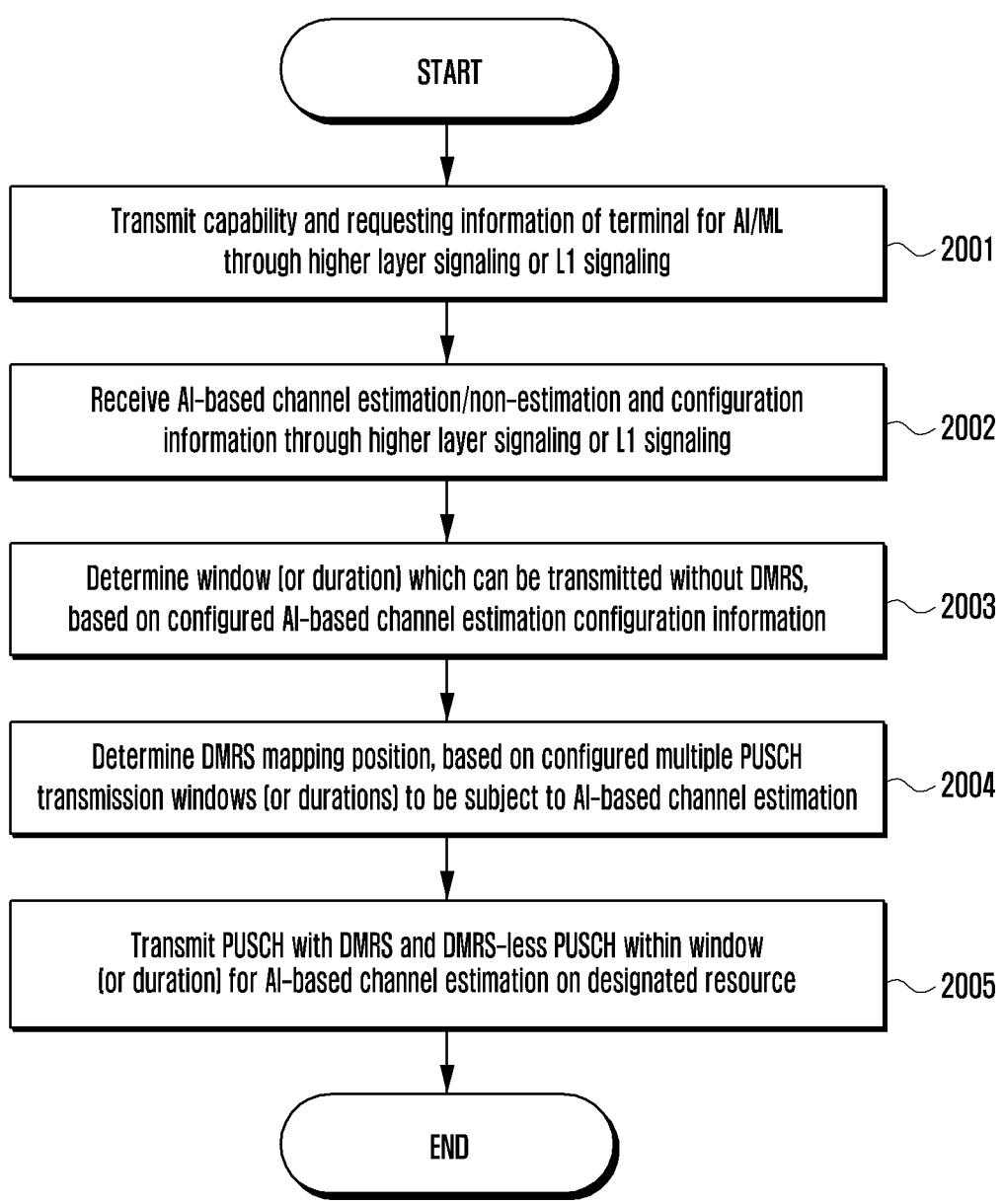
FIG. 20 is a flowchart illustrating an operation of a terminal which controls an AI-based joint channel estimation and DMRS mapping according to an embodiment of the disclosure.

FIG. 20 is a flowchart illustrating an operation of a terminal which controls AI-based joint channel estimation and DMRS mapping according to an embodiment of the disclosure.

Referring to FIG. 20, a terminal may transmit, to a base station and through higher layer signaling or L1 signaling, capability and/or requesting information of a terminal for supporting AI/ML at operation 2001. Thereafter, the terminal may receive, from the base station and through higher layer signaling or L1 signaling, AI-based channel estimation configuration information at operation 2002. Thereafter, the terminal may determine a window (or duration) for application of AI-based channel estimation, based on the received configuration information at operation 2003. A window (or duration) may be configured based on an available slot determined through TDRA configured for a PUSCH transmission and semi-static RRC configurations (e.g., tdd-UL-DL-ConfigurationCommon, tdd-UL-DL-Configuration-Dedicated, and ssb-PositionsInBurst) in consideration of Rel-17 PUSCH transmission. In addition, the same may be configured in consideration of consecutive physical slots in a case of Rel-15/16 PUSCH transmission. Thereafter, the terminal may determine a position to which a DMRS is mapped in the determined window at operation 2004. The terminal may apply a method of the third embodiment or the fourth embodiment as a method for mapping a DMRS in the determined window. In addition, the base station may selectively configure a DMRS-including PUSCH and a DMRS-less PUSCH. The same may be variously PUSCH configured through a predefined scheme, a bitmap scheme, and configuration of the number of a PUSCH to include a DMRS in the window as configuration methods using the unit of PUSCHs. Lastly, the terminal may transmit, to the base station, a DMRS-including PUSCH and a DMRS-less PUSCH, based on the determined information at operation 2005.

Based on the flowcharts for the base station and the terminal, the base station and the terminal may provide AI-based channel estimation, and may resolve a DMRS overhead problem according to a DMRS-less PUSCH transmission. Therefore, an uplink coverage can be improved, and more effective usage can be accomplished in an ultra-high frequency (mmWave) band communication system.

FIG. 21 is a diagram illustrating a window configuration method and a DMRS mapping method for performing an AI-based joint channel estimation at the time of PUSCH repetitive transmissions in an FDD system according to an embodiment of the disclosure.

Referring to FIG. 21, a method 2101 for configuring a window based on configuration information 2102 for AI-based channel estimation received by a terminal from a base station during a PUSCH repetitive transmission, and a method 2103 for configuring a window in which actual AI-based channel estimation considering an actually transmitted PUSCH are provided. The terminal may receive AI-based channel estimation configuration information including window=6 slots or repetitions, and Non-consecutive='disabled' or 'off' through higher layer signaling and L1 signaling at operation 2102. The terminal may determine time domain windows (TDWs) (e.g., AI-based TDW #1, AI-based TDW #2, and AI-based TDW #3) for AI-based channel estimation with respect to a PUSCH repetitive transmission, based on the received AI-based channel estimation configuration information. The terminal may map a DMRS to an AI-based TDW by using a DMRS pattern configured for the terminal through higher layer signaling and L1 signaling. The configured DMRS pattern may be configured by various methods or a combination thereof, such as density, the gap between DMRSs, the total number of DMRSs, a sequence-based scheme, a bitmap scheme, or a predefined scheme (e.g., the half of an AI-based TDW). Thereafter, the terminal may determine an AI-based actual duration according to events 2104 make an AI-based channel estimation impossible in the AI-based TDWs. The described event may indicate a case in which a condition for AI-based channel estimation between PUSCHs fails to be maintained due to higher layer signaling and L1 signaling. When an event occurs, the terminal may perform again or stop the AI-based channel estimation according to the capability of the terminal or a timeline is satisfied. When the terminal is able to perform again the AI-based channel estimation after the event, the terminal may configure one or more AI based actual durations in the AI-based TDW. More specifically, referring to FIG. 21, when the event 2104 occurs in AI-based TDW #1, and the terminal is able to perform again an AI-based channel estimation after the event, the terminal may determine AI-based actual duration #1-1 and AI-based actual duration #1-2 in AI-based TDW #1. DMRS mapping methods which have been previously applied in AI based TDW #1 may be applied to each of AI-based actual durations at operation 2103.

FIG. 22 is a diagram illustrating a window configuration method and a DMRS mapping method for performing an AI-based joint channel estimation at the time of PUSCH repetitive transmission in an TDD system according to an embodiment of the disclosure.

Referring to FIG. 22, a method 2201 for configuring a window based on configuration information 2202 for AI-based channel estimation received by a terminal from a base station during a PUSCH repetitive transmission, and a method 2203 for configuring a window in which actual AI-based channel estimation considering an actually transmitted PUSCH are provided. The terminal may receive AI-based channel estimation configuration information including window=7 slots or repetitions, and Non-consecutive='disabled' or 'off' through higher layer signaling and L1 signaling at operation 2202. The terminal may determine time domain windows (TDWs) (e.g., AI-based TDW #1, AI-based TDW #2, and AI-based TDW #3) for an AI-based channel estimation considering a physical slot or an available slot with respect to a PUSCH repetitive transmission, based on the received AI-based channel estimation configuration information and whether to perform available slot-based counting. More specifically, as illustrated in FIG. 22, when the length of an AI-based window is configured to be 7 slots, and available slot-based counting is configured, the terminal may determine, as AI based TDW #1, seven slots from the first available slot S #0, and may determine as the second AI based TDW #2, seven slots from the next available slot S #2. The terminal may map a DMRS to an AI-based TDW by using a DMRS pattern configured for the terminal through higher layer signaling and L1 signaling. The configured DMRS pattern may be configured by various methods or a combination thereof, such as density, the gap between DMRSs, the total number of DMRSs, a sequence-based scheme, a bitmap scheme, or a predefined scheme (e.g., the half of the number of available slots in an AI-based TDW). Thereafter, the terminal may determine an AI-based actual duration according to events 2204 make an AI-based channel estimation impossible in the AI-based TDW. The described event may indicate a case in which a condition for AI-based channel estimation between PUSCHs fails to be maintained due to higher layer signaling and L1 signaling. When an event occurs, the terminal may perform again or stop the AI-based channel estimation according to whether the capability of the terminal or a timeline is satisfied. When the terminal is able to perform again the AI-based channel estimation after the event, the terminal may configure one or more AI based actual durations in the AI-based TDW. More specifically, referring to FIG. 22, when the event 2204 occurs in AI-based TDW #1, and the terminal is able to perform again an AI-based channel estimation after the event, the terminal may determine AI-based actual duration #1-1 and AI-based actual duration #1-2 in AI-based TDW #1. DMRS mapping methods which have been previously applied in AI based TDW #1 may be applied to each of AI-based actual durations at operation 2203.

Through the method of the disclosure, a window based on a configuration for AI-based channel estimation, and an actual duration to which actual channel estimation is applied may be determined in an FDD or TDD system. Therefore, an uplink coverage can be improved by resolving a DMRS overhead problem through a DMRS-less PUSCH transmission in an interval in which AI-based channel estimation is performed.

Elements or operations of the embodiments and methods described in the disclosure may be selectively coupled/combined to be applied.

Figure 23:
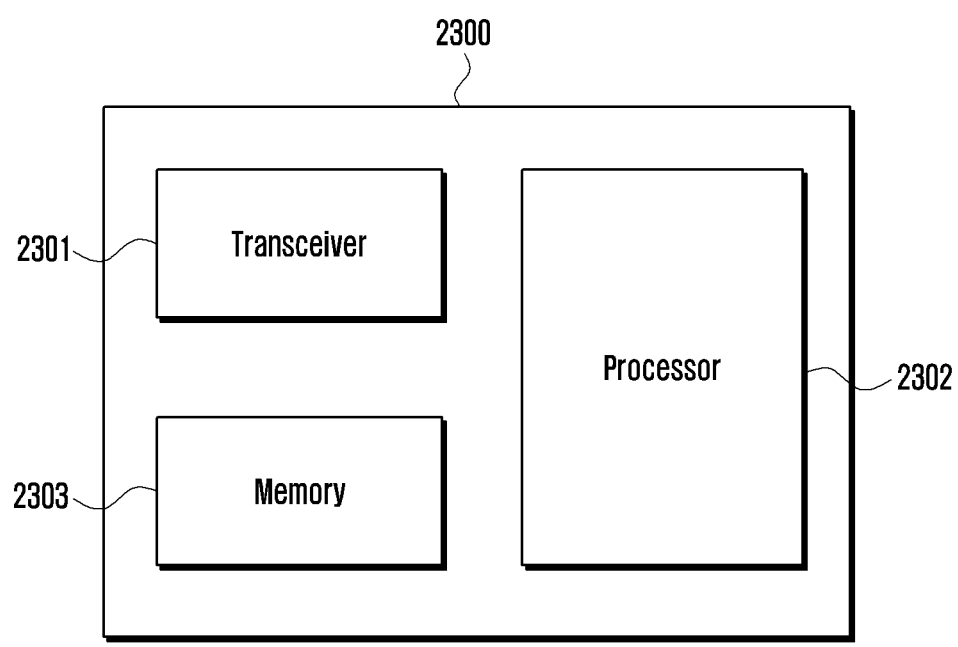
FIG. 23 is a block diagram of a terminal according to an embodiment of the disclosure.

FIG. 23 is a block diagram of a terminal according to an embodiment of the disclosure.

Referring to FIG. 23, a terminal 2300 may include a transceiver 2301, a controller (processor) 2302, and a storage unit (memory) 2303. According to an efficient channel and signal transmission or reception method for a 5G communication system corresponding to the above embodiments, the transceiver 2301, the controller 2302, and the storage unit 2303 of the terminal 2300 may be operated. However, the elements of the terminal 2300 according to an embodiment are not limited to the above example. According to another embodiment, the terminal 2300 may also include more or fewer elements than the above elements. In addition, in a particular case, the transceiver 2301, the controller 2302, and the storage unit 2303 may be implemented in a single chip type.

The transceiver 2301 may also be configured by a transmitter and a receiver according to another embodiment. The transceiver 2301 may transmit or receive a signal to or from a base station. The signal may include control information and data. To this end, the transceiver 2301 may include an RF transmitter that up-converts and amplifies a frequency of a transmitted signal, an RF receiver that low-noise amplifies a received signal and down-converts the frequency, and the like. In addition, the transceiver 2301 may receive a signal through a wireless channel and output the signal to the controller 2302, and may transmit a signal output from the controller 2302, through a wireless channel.

The controller 2302 may control a series of processes allowing the terminal 2300 to be operated according to an embodiment of the disclosure described above. For example, the controller 2302 may perform a method of changing the OFDM symbol position of a DMRS by considering a method of estimating a channel by jointly using DMRSs transmitted in multiple PUSCHs according to an embodiment. To this end, the controller 2302 may include at least one processor. For example, the controller 2302 may include a communication processor (CP) performing a control for communication, and an application processor (AP) controlling a higher layer, such as an application program.

The storage unit 2303 may store control information or data such as information related to a channel estimation using DMRSs transmitted in a PUSCH included in a signal obtained by the terminal 2300, and may have a region for storing data required for control of the controller 2302, and data generated when the controller 2302 performs control.

Figure 24:
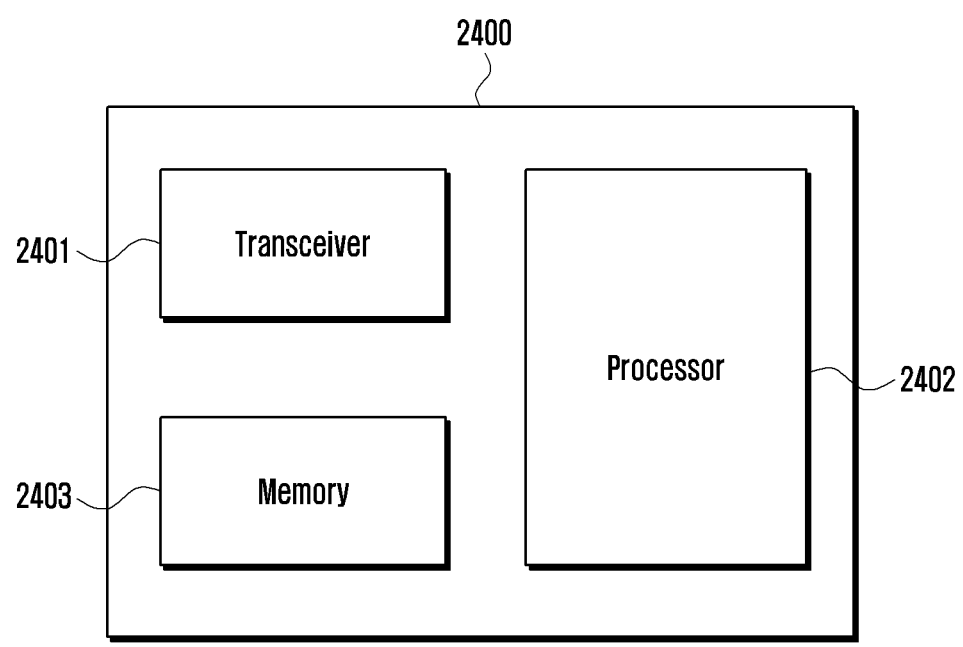
FIG. 24 is a block diagram of a base station according to an embodiment of the disclosure.

FIG. 24 is a block diagram of a base station according to an embodiment of the disclosure.

Referring to FIG. 24, a base station 2400 may include a transceiver 2401, a controller (processor) 2402, and a storage unit (memory) 2403. According to an efficient channel and signal transmission or reception method for a 5G communication system corresponding to the above embodiments, the transceiver 2401, the controller 2402, and the storage unit 2403 of the base station 2400 may be operated. However, the elements of the base station 2400 according to an embodiment are not limited to the above example. According to another embodiment, base station 2400 may also include more or fewer elements than the above elements. In addition, in a particular case, the transceiver 2401, the controller 2402, and the storage unit 2403 may be implemented in a single chip type.

The transceiver 2401 may also be configured by a transmitter and a receiver according to another embodiment. The transceiver 2401 may transmit or receive a signal to or from a terminal. The signal may include control information and data. To this end, the transceiver 2401 may include an RF transmitter that up-converts and amplifies a frequency of a transmitted signal, an RF receiver that low-noise amplifies a received signal and down-converts the frequency, and the like. In addition, the transceiver 2401 may receive a signal through a wireless channel and output the signal to the controller 2402, and may transmit a signal output from the controller 2402, through a wireless channel.

The controller 2402 may control a series of processes so that the base station 2400 can operate according to an embodiment of the disclosure described above. For example, the controller 2402 may perform a method of changing the OFDM symbol position of a DMRS by considering a method of estimating a channel by using DMRSs transmitted in a PUSCH according to an embodiment. To this end, the controller 2402 may include at least one processor. For example, the controller 2402 may include a communication processor (CP) performing a control for communication, and an application processor (AP) controlling a higher layer, such as an application program.

The storage unit 2403 may store control information or data such as information related to a channel estimation using DMRSs transmitted in a PUSCH determined by the base station 2400, or control information or data received from a terminal, and may have a region for storing data required for control of the controller 2402, and data generated when the controller 2402 performs control.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
    receiving, from a base station, configuration information on a repetition transmission of a physical uplink shared channel (PUSCH);
    receiving, from the base station, information for determining an invalid symbol;
    identifying at least one actual repetition including one symbol based on the configuration information on the repetition transmission of the PUSCH and the information for determining the invalid symbol;
    mapping at least one of a PUSCH or demodulation reference signal (DMRS) to the at least one actual repetition including one symbol; and
    transmitting, to the base station, the at least one of the PUSCH or the DMRS mapped to the at least one actual repetition including one symbol, and at least one PUSCH mapped to at least one actual repetition including at least two symbols.

2. The method of claim 1, wherein the information for determining the invalid symbol comprises at least one of configuration information for indicating whether each symbol is a downlink symbol and information on an invalid symbol pattern.

3. The method of claim 1, further comprising:
    receiving, from the base station, information on a joint channel estimation configuration;
    determining at least one actual repetition group based on the configuration information on the repetition transmission of the PUSCH, the information for determining the invalid symbol, and the information on the joint channel estimation configuration; and
    transmitting, to the base station, at least one DMRS according to the at least one actual repetition group.

4. The method of claim 1, wherein the configuration information on the repetition transmission of the PUSCH comprises at least one of a starting symbol of the PUSCH, symbol length of the PUSCH, a number of a repetition, or an PUSCH mapping type.

5. A method performed by a base station in a wireless communication system, the method comprising:
    transmitting, to a terminal, configuration information on a repetition transmission of a physical uplink shared channel (PUSCH);
    transmitting, to the terminal, information for determining an invalid symbol;
    identifying at least one actual repetition including one symbol based on the configuration information on the repetition transmission of the PUSCH and the information for determining the invalid symbol; and
    receiving, from the terminal, at least one of a PUSCH or demodulation reference signal (DMRS) mapped to the at least one actual repetition including one symbol, and at least one PUSCH mapped to at least one actual repetition including at least two symbols.

6. The method of claim 5, wherein the information for determining the invalid symbol comprises at least one of configuration information for indicating whether each symbol is a downlink symbol and information on an invalid symbol pattern.

7. The method of claim 5, further comprising:
    transmitting, to the terminal, information on a joint channel estimation configuration;
    determining at least one actual repetition group based on the configuration information on the repetition transmission of the PUSCH, the information for determining the invalid symbol, and the information on the joint channel estimation configuration; and
    receiving, from the terminal, at least one DMRS according to the at least one actual repetition group.

8. The method of claim 5, wherein the configuration information on the repetition transmission of the PUSCH comprises at least one of a starting symbol of the PUSCH, symbol length of the PUSCH, a number of a repetition, or an PUSCH mapping type.

9. A terminal in a wireless communication system, the terminal comprising:
    a transceiver; and
    a controller coupled with the transceiver and configured to:
        receive, from a base station, configuration information on a repetition transmission of a physical uplink shared channel (PUSCH),
        receive, from the base station, information for determining an invalid symbol,
        identify at least one actual repetition including one symbol based on the configuration information on the repetition transmission of the PUSCH and the information for determining the invalid symbol,
        map at least one of a PUSCH or demodulation reference signal (DMRS) to the at least one actual repetition including one symbol, and
        transmit, to the base station, the at least one of the PUSCH or the DMRS mapped to the at least one actual repetition including one symbol, and at least one PUSCH mapped to at least one actual repetition including at least two symbols.

10. The terminal of claim 9, wherein the information for determining the invalid symbol comprises at least one of configuration information for indicating whether each symbol is a downlink symbol and information on an invalid symbol pattern.

11. The terminal of claim 9, wherein the controller is further configured to:
    receive, from the base station, information on a joint channel estimation configuration,
    determine at least one actual repetition group based on the configuration information on the repetition transmission of the PUSCH, the information for determining the invalid symbol, and the information on the joint channel estimation configuration, and
    transmit, to the base station, at least one DMRS according to the at least one actual repetition group.

12. The terminal of claim 9, wherein the configuration information on the repetition transmission of the PUSCH comprises at least one of a starting symbol of the PUSCH, symbol length of the PUSCH, a number of a repetition, or an PUSCH mapping type.

13. A base station in a wireless communication system, the base station comprising:
- a transceiver; and
- a controller coupled with the transceiver and configured to:
  - transmit, to a terminal, configuration information on a repetition transmission of a physical uplink shared channel (PUSCH),
  - transmit, to the terminal, information for determining an invalid symbol,
  - identify at least one actual repetition including one symbol based on the configuration information on the repetition transmission of the PUSCH and the information for determining the invalid symbol, and
  - receive, from the terminal, at least one of a PUSCH or demodulation reference signal (DMRS) mapped to the at least one actual repetition including one symbol, and at least one PUSCH mapped to at least one actual repetition including at least two symbols.

14. The base station of claim 13, wherein the information for determining the invalid symbol comprises at least one of configuration information for indicating whether each symbol is a downlink symbol and information on an invalid symbol pattern, and
  wherein the configuration information on the repetition transmission of the PUSCH comprises at least one of a starting symbol of the PUSCH, symbol length of the PUSCH, a number of a repetition, or an PUSCH mapping type.

15. The base station of claim 13, wherein the controller is further configured to:
  - transmit, to the terminal, information on a joint channel estimation configuration,
  - determine at least one actual repetition group based on the configuration information on the repetition transmission of the PUSCH, the information for determining the invalid symbol, and the information on the joint channel estimation configuration, and
  - receive, from the terminal, at least one DMRS according to the at least one actual repetition group.

* * * * *